US010616707B2

(12) United States Patent
McLarty et al.

(10) Patent No.: US 10,616,707 B2
(45) Date of Patent: Apr. 7, 2020

(54) METHOD OF SHOWING AVAILABILITY ZONES ON A MAP FOR CUSTOMER-OWNED AND CLOUD PROVIDER-OWNED DATACENTERS

(71) Applicant: Nutanix, Inc., San Jose, CA (US)

(72) Inventors: Melina McLarty, Aptos, CA (US); John Torres, San Jose, CA (US); Van Co, San Jose, CA (US)

(73) Assignee: NUTANIX, INC., San Jose, CA (US)

(*) Notice: Subject to any disclaimer, the term of this patent is extended or adjusted under 35 U.S.C. 154(b) by 0 days.

(21) Appl. No.: 15/879,923

(22) Filed: Jan. 25, 2018

(65) Prior Publication Data

US 2019/0230462 A1  Jul. 25, 2019

(51) Int. Cl.

| H04W 4/02 | (2018.01) |
|---|---|
| H04L 29/08 | (2006.01) |
| H04L 12/24 | (2006.01) |
| H04W 64/00 | (2009.01) |

(52) U.S. Cl.
CPC ............ *H04W 4/02* (2013.01); *H04L 41/12* (2013.01); *H04L 41/22* (2013.01); *H04L 67/10* (2013.01); *H04L 67/1097* (2013.01); *H04L 67/12* (2013.01); *H04L 67/18* (2013.01); *H04W 64/003* (2013.01)

(58) Field of Classification Search
CPC ......... H04L 41/12; H04L 41/22; H04L 67/10; H04L 67/1097; H04L 67/12; H04L 67/18; H04W 4/02; H04W 64/003
See application file for complete search history.

(56) References Cited

U.S. PATENT DOCUMENTS

| 8,549,518 | B1 | 10/2013 | Aron et al. | |
|---|---|---|---|---|
| 8,601,473 | B1 | 12/2013 | Aron et al. | |
| 8,850,130 | B1 | 9/2014 | Aron et al. | |
| 9,516,133 | B2* | 12/2016 | Nakamura | H04W 4/02 |
| 9,772,866 | B1 | 9/2017 | Aron et al. | |
| 10,079,877 | B2* | 9/2018 | Paramasivam | H04L 67/1006 |

OTHER PUBLICATIONS

Poitras, Steven. "The Nutanix Bible" (Jan. 3, 2017), from https://nutanixbible.com/.

(Continued)

*Primary Examiner* — Azizul Choudhury
(74) *Attorney, Agent, or Firm* — Foley & Lardner LLP

(57) ABSTRACT

A method of discovering geographic locations of one or more data centers of a data center cluster. The method includes receiving a request for geolocation data of a first data center of a data center cluster; identifying a host machine of a second data center of the data center cluster based on the request. The method includes sending a discovery request to the host machine of the second data center. The discovery request configured to cause operations comprising generating, by the host machine of the second data center, discovery data associated with a host machine of a first data center. The method includes generating display data based on the discovery data. The method includes sending the display data to the user device. The display data configured to cause the user device to display the geolocation data of the first data center in a window of the application.

37 Claims, 8 Drawing Sheets

(56) References Cited

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2018), from https://nutanixbible.com/.

Poitras, Steven. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

Cano, Ignacio, et al. "Curator: Self-Managing Storage for Enterprise Clusters" (Mar. 27, 2017), from https://www.usenix.org/conference/nsdi17/.

* cited by examiner

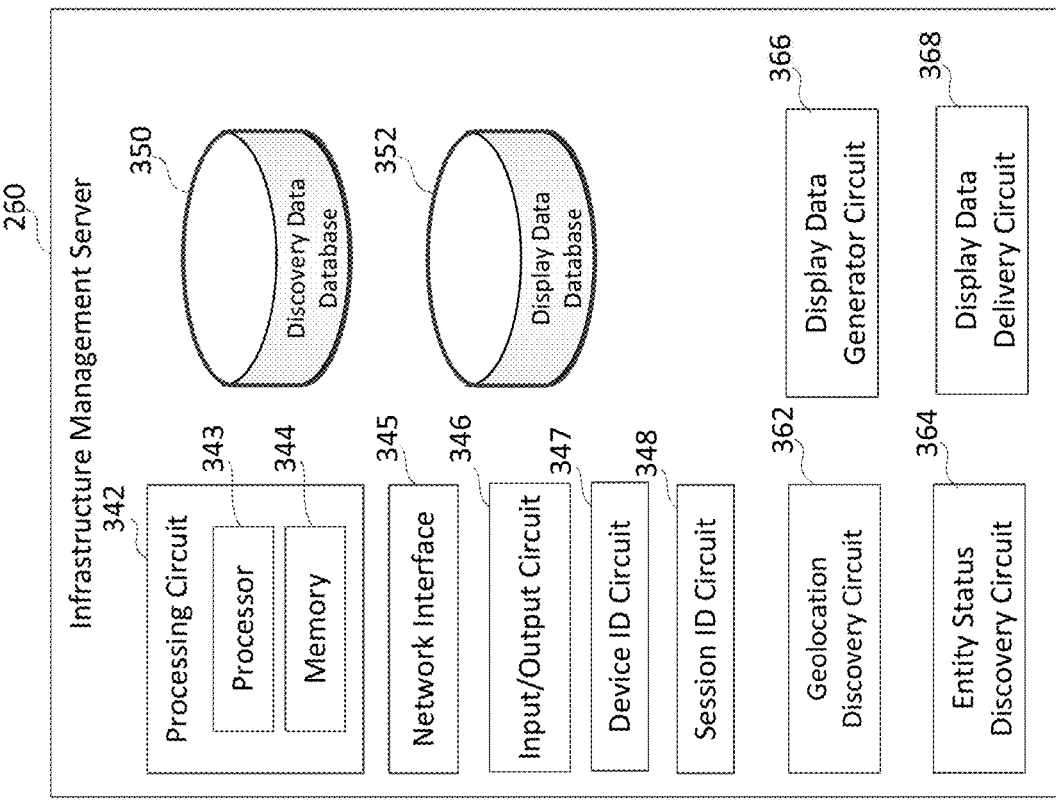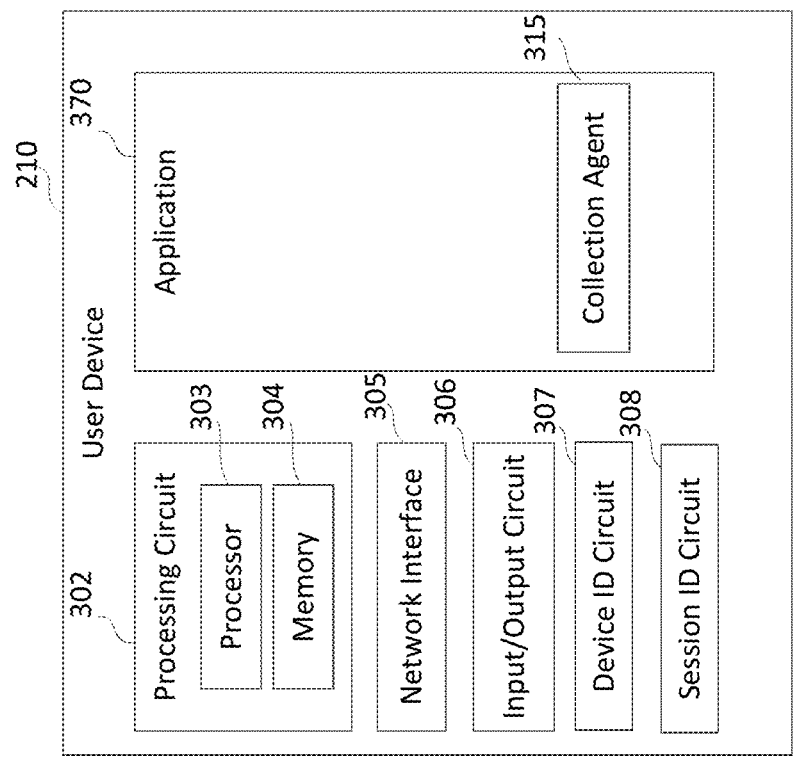
Fig. 3B
Fig. 3A

Dashboard Viewer — http://infrastructuremanagementserver.com — 402b

Tabs: Home | DC Map | (VM Map) | Storage | Hardware | Analysis | Settings | Alerts — 405b / 412b

| DC Identification | Rack ID | Host ID | User VM ID | DC Status |
|---|---|---|---|---|
| 220a | R7 | 101a-1 | 105a-1 | ✓ Running |
| 220a | R1 | 101a-2 | 105a-2 | ✓ Running |
| 220a | R2 | 101a-3 | 105a-3 | ✗ Offline |
| 220b | R9 | 101b-1 | 105b-4 | ✓ Running |
| 220b | R23 | 101b-2 | 105b-1 | ✓ Running |
| 220b | R4 | 101b-3 | 105b-2 | ✓ Running |
| 220c | R54 | 101c-1 | 105c-6 | ✓ Running |
| 220c | R31 | 101c-1 | 105c-2 | ✗ Offline |
| 220c | R12 | 101c-2 | 105c-1 | ✓ Running |
| 220d | R43 | 101d-1 | 105d-3 | ✓ Running |
| 220d | R21 | 101d-2 | 105d-2 | ✓ Running |
| 220d | R27 | 101d-3 | 105d-1 | ✓ Running |
| 240a | R51 | 101a-1 | 105d-1 | ✓ Running |
| 240a | R6 | 101a-2 | 105d-2 | ✓ Running |
| 240a | R25 | 101a-3 | 105d-3 | ✓ Running |
| 240b | R110 | 101b-3 | 105b-1 | ✓ Running |
| 240b | R63 | 101b-3 | 105b-2 | ✓ Running |
| 240b | R3 | 101b-1 | 105b-3 | ✗ Offline |
| 240c | R15 | 101c-2 | 105c-1 | ✓ Running |
| 240c | R1 | 101c-3 | 105c-2 | ✓ Running |
| 240c | R5 | 101c-1 | 105c-3 | ✓ Running |

Scan Cluster — 410b

```
┌─────────────────────────────────────────────────────────┐
│ Receiving, by an infrastructure management server and from │
│ an application executing on a user device, a request for   │
│ geolocation data of a first data center of a data center cluster │
│ 502                                                      │
└─────────────────────────────────────────────────────────┘
                            │
                            ▼
┌─────────────────────────────────────────────────────────┐
│ Identifying, by the infrastructure management server, a host │
│ machine of a second data center of the data center cluster │
│ based on the request 504                                  │
└─────────────────────────────────────────────────────────┘
                            │
                            ▼
┌─────────────────────────────────────────────────────────┐
│ Sending, by the infrastructure management server, a      │
│ discovery request to the host machine of the second data │
│ center, the discovery request causing operations comprising │
│ generating, by the host machine of the second data center, │
│ discovery data associated with a host machine of a first data │
│ center of the data center cluster 506                    │
└─────────────────────────────────────────────────────────┘
                            │
                            ▼
┌─────────────────────────────────────────────────────────┐
│ Generating, by the infrastructure management server,     │
│ display data based on the discovery data 508             │
└─────────────────────────────────────────────────────────┘
                            │
                            ▼
┌─────────────────────────────────────────────────────────┐
│ Sending, by the infrastructure management server,        │
│ the display data to the user device, the display data causing │
│ the user device to display the geolocation data of the first │
│ data center in a window of the application 510          │
└─────────────────────────────────────────────────────────┘
                            │
                            ▼
                    Additional request?  ──Y──▶
                         512
                            │
                            N
                            ▼
┌─────────────────────────────────────────────────────────┐
│ Disconnecting, by the infrastructure management server,  │
│ from the user device 514                                 │
└─────────────────────────────────────────────────────────┘
```

Receiving, by an infrastructure management server and from an application executing on a user device, a request for entity data associated with one or more data centers of a data center cluster 602

Identifying, by the infrastructure management server, a host machine of a data center of the one or more data centers based on the request 604

Sending, by the infrastructure management server, a discovery request to the host machine of the data center, the discovery request causing operations comprising generating, by the host machine of the data center, entity data associated with the host machine of the data center and a second host machine of a second data center 606

Generating, by the infrastructure management server, display data based on the entity data 608

Sending, by the infrastructure management server, the display data to the user device, the display data causing the user device to display the entity data in a window of the application 610

Additional request? 612 — Y

N

Disconnecting, by the infrastructure management server, from the user device 614

FIG. 6

METHOD OF SHOWING AVAILABILITY ZONES ON A MAP FOR CUSTOMER-OWNED AND CLOUD PROVIDER-OWNED DATACENTERS

BACKGROUND

A virtual machine ("VM") may refer to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

SUMMARY

Aspects of the present disclosure relate generally to a cloud infrastructure and virtual environment management system, and more particularly to systems and methods for automatically discovering the geographic locations of the customer-owned data centers and the cloud provider-owned data centers of a data center cluster.

One implementation disclosed herein is a method of discovering the geographic locations of one or more data centers of a data center cluster. The method includes receiving, by an infrastructure management server and from an application executing on a user device, a request for geolocation data of a first data center of a data center cluster. In some implementations, the method includes identifying, by the infrastructure management server, a host machine of a second data center of the data center cluster based on the request. In some implementations, the method includes sending, by the infrastructure management server, a discovery request to the host machine of the second data center. The discovery request causing operations comprising generating, by the host machine of the second data center, discovery data associated with a host machine of a first data center of the data center cluster. In some implementations, the method includes generating, by the infrastructure management server, display data based on the discovery data. In some implementations, the method includes sending, by the infrastructure management server, the display data to the user device, the display data causing the user device to display the geolocation data of the first data center in a window of the application.

In some implementations, the first data center is owned by one of a customer and a cloud provider and wherein the second data center is owned by the other of the customer and the cloud provider.

In some implementations, identifying the host machine of the second data center of the data center cluster includes retrieving, by the infrastructure management server, a list of data center clusters from a database. In some implementations, each data center cluster having a plurality of host machines associated with a customer and a plurality of host machines associated with a cloud provider.

In some implementations, the method includes comparing, by the infrastructure management server, the request for the geolocation data to the list of data center clusters to determine a match.

In some implementations, the method includes extracting, by the infrastructure management server in response to determining the match, a network identifier of the host machine of the second data center.

In some implementations, the method includes establishing, by the infrastructure management server based on the network identifier, a communication channel between the infrastructure management server and the host machine of the second data center.

In some implementations, the discovery request further causing operations comprising identifying, by the host machine of the second data center, the host machine of the first data center.

In some implementations, the discovery request further causing operations comprising measuring, by the host machine of the second data center, a round-trip time of a message routing between the host machine of the second data center and the host machine of the first data center;

In some implementations, the discovery request further causing operations comprising generating, by the host machine of the second data center and based on the round-trip time of the message, discovery data associated with the host machine of the first data center of the data center cluster.

In some implementations, identifying, by the infrastructure management server, the host machine of the second data center comprising extracting, by the infrastructure management server from the request for the geolocation data, a network address associated with the host machine of the second data center.

In some implementations, identifying, by the infrastructure management server, the host machine of the second data center comprising sending, by the infrastructure management server based on the network address, the discovery request to the host machine of the second data center.

In some implementations, generating, by the infrastructure management server, the display data based on the discovery data comprising sending, by the infrastructure management server, a second discovery request to the second host machine of the second data center, the second discovery request causing operations comprising generating second discovery data associated with the host machine of the first data center of the data center cluster; and generating, by the infrastructure management server, the display data based on the discovery data and the second discovery data.

In some implementations, the discovery request causing operations further comprising sending, by the host machine of the second data center, a second discovery request to a second host machine of the second data cluster; wherein the second discovery request causing operations comprising generating, by the second host, second discovery data associated with the host machine of the first data center.

In some implementations, the method includes generating, by the infrastructure management server, display data based on the discovery data and the second discovery data.

In some implementations, the display data further causing operations comprising displaying, by the user device in the window of the application and on a geographical map, the geolocation data of the first data center and a geolocation of the second data center.

In another aspect, the present disclosure is directed to a system for discovering the geographic locations of one or more data centers of a data center cluster. The system comprising an infrastructure management server configured to receive, from an application executing on a user device, a request for geolocation data of a first data center of a data center cluster. In some implementations, the system is configured to identify a host machine of a second data center of the data center cluster based on the request.

In some implementations, the system is configured to send a discovery request to the host machine of the second data center, the discovery request causes the host machine of the second data center to generate discovery data associated with a host machine of a first data center of the data center cluster.

In some implementations, the system is configured to generate display data based on the discovery data. In some implementations, the system is configured to send the display data to the user device, the display data causing the user device to display the geolocation data of the first data center in a window of the application.

In some implementations, the first data center owned by one of a customer and a cloud provider and wherein the second data center owned by the other of the customer and the cloud provider.

In some implementations, the infrastructure management server further configured to retrieve a list of data center clusters from a database, each data center cluster having a plurality of host machines associated with a customer and a plurality of host machines associated with a cloud provider. In some implementations, the infrastructure management server further configured to compare the request for the geolocation data to the list of data center clusters to determine a match. In some implementations, the infrastructure management server further configured to extract, in response to determining the match, a network identifier of the host machine of the second data center. In some implementations, the infrastructure management server further configured to establish, based on the network identifier, a communication channel between the infrastructure management server and the host machine of the second data center.

In some implementations, the discovery request further causes the host machine of the second data center to identify the host machine of the first data center.

In some implementations, the discovery request further causes the host machine of the second data center to measure a round-trip time of a message routing between the host machine of the second data center and the host machine of the first data center. In some implementations, the discovery request further causes the host machine of the second data center to generate, based on the round-trip time of the message, discovery data associated with the host machine of the first data center of the data center cluster.

In some implementations, the infrastructure management server further configured to extract, from the request for the geolocation data, a network address associated with the host machine of the second data center and send, based on the network address, the discovery request to the host machine of the second data center.

In some implementations, the infrastructure management server further configured to send a second discovery request to the second host machine of the second data center, the second discovery request causing operations comprising generating second discovery data associated with the host machine of the first data center of the data center cluster and generate the display data based on the discovery data and the second discovery data.

In some implementations, the discovery request further causes the host machine of the second data center to send a second discovery request to a second host machine of the second data cluster; wherein the second discovery request causing operations comprising generating, by the second host, second discovery data associated with the host machine of the first data center.

In some implementations, the infrastructure management server further configured to generate display data based on the discovery data and the second discovery data.

In some implementations, the display data further causing the user device to display, in the window of the application and on a geographical map, the geolocation data of the first data center and a geolocation of the second data center.

In another aspect, the present disclosure is directed to a non-transitory computer readable storage medium to store a computer program configured to execute a method for discovering the geographic locations of one or more data centers of a data center cluster. The method includes receiving, by an infrastructure management server and from an application executing on a user device, a request for geolocation data of a first data center of a data center cluster. In some implementations, the method includes identifying, by the infrastructure management server, a host machine of a second data center of the data center cluster based on the request. In some implementations, the method includes sending, by the infrastructure management server, a discovery request to the host machine of the second data center. The discovery request causing operations comprising generating, by the host machine of the second data center, discovery data associated with a host machine of a first data center of the data center cluster. In some implementations, the method includes generating, by the infrastructure management server, display data based on the discovery data. In some implementations, the method includes sending, by the infrastructure management server, the display data to the user device, the display data causing the user device to display the geolocation data of the first data center in a window of the application.

In another aspect, the present disclosure is directed to a method of discovering the status of entities associated with one or more data centers of a data center cluster. The method including receiving, by an infrastructure management server and from an application executing on a user device, a request for entity data associated with one or more data centers of a data center cluster; identifying, by the infrastructure management server, a host machine of a data center of the one or more data centers based on the request; sending, by the infrastructure management server, a discovery request to the host machine of the data center, the discovery request causing operations comprising generating, by the host machine of the data center, entity data associated with the host machine of the data center and a second host machine of a second data center; generating, by the infrastructure management server, display data based on the entity data; and sending, by the infrastructure management server, the display data to the user device, the display data causing the user device to display the entity data in a window of the application.

In another aspect, the present disclosure is directed to a system for discovering the status of entities associated with one or more data centers of a data center cluster, the system comprising an infrastructure management server configured to receive, from an application executing on a user device, a request for entity data associated with one or more data centers of a data center cluster; identify a host machine of a data center of the one or more data centers based on the request; send a discovery request to the host machine of the data center, the discovery request causing operations comprising generating, by the host machine of the data center, entity data associated with the host machine of the data center and a second host machine of a second data center; generate display data based on the entity data; and send the display data to the user device, the display data causing the user device to display the entity data in a window of the application In another aspect, the present disclosure is directed to a non-transitory computer readable storage medium to store a computer program configured to execute a method for discovering the status of entities associated with one or more data centers of a data center cluster. The method including receiving, by an infrastructure management server and from an application executing on a user device, a request for entity data associated with one or more data centers of a data center cluster; identifying, by the infrastructure management server, a host machine of a data center of the one or more data centers based on the request; sending, by the infrastructure management server, a discovery request to the host machine of the data center, the discovery request causing operations comprising generating, by the host machine of the data center, entity data associated with the host machine of the data center and a second host machine of a second data center; generating, by the infrastructure management server, display data based on the entity data; and sending, by the infrastructure management server, the display data to the user device, the display data causing the user device to display the entity data in a window of the application.

BRIEF DESCRIPTION OF THE DRAWINGS

Illustrative embodiments will hereafter be described with reference to the accompanying drawings.

FIG. 3A is a block diagram depicting an example user device of the environment in FIG. 1, according to an illustrative implementation.

FIG. 3B is a block diagram depicting an example infrastructure management server of the environment in FIG. 1, according to an illustrative implementation.

FIG. 4B is a diagram depicting an example browser for displaying the geographic locations of customer-owned data centers and cloud provider-owned data centers of a data center cluster, according to an illustrative implementation.

FIG. 5 is a flow diagram depicting a method for automatically discovering the geographic locations of customer-owned data centers and cloud provider-owned data centers of a data center cluster and the status of their respective entities, according to an illustrative implementation.

FIG. 6 is a flow diagram depicting a method for automatically discovering the status of the entities associated with data centers spanning across multiple geographic locations and causing display of the entity status in a single-view, according to an illustrative implementation.

Like reference numbers and designations in the various drawings indicate like elements.

DETAILED DESCRIPTION

Figure 1A:
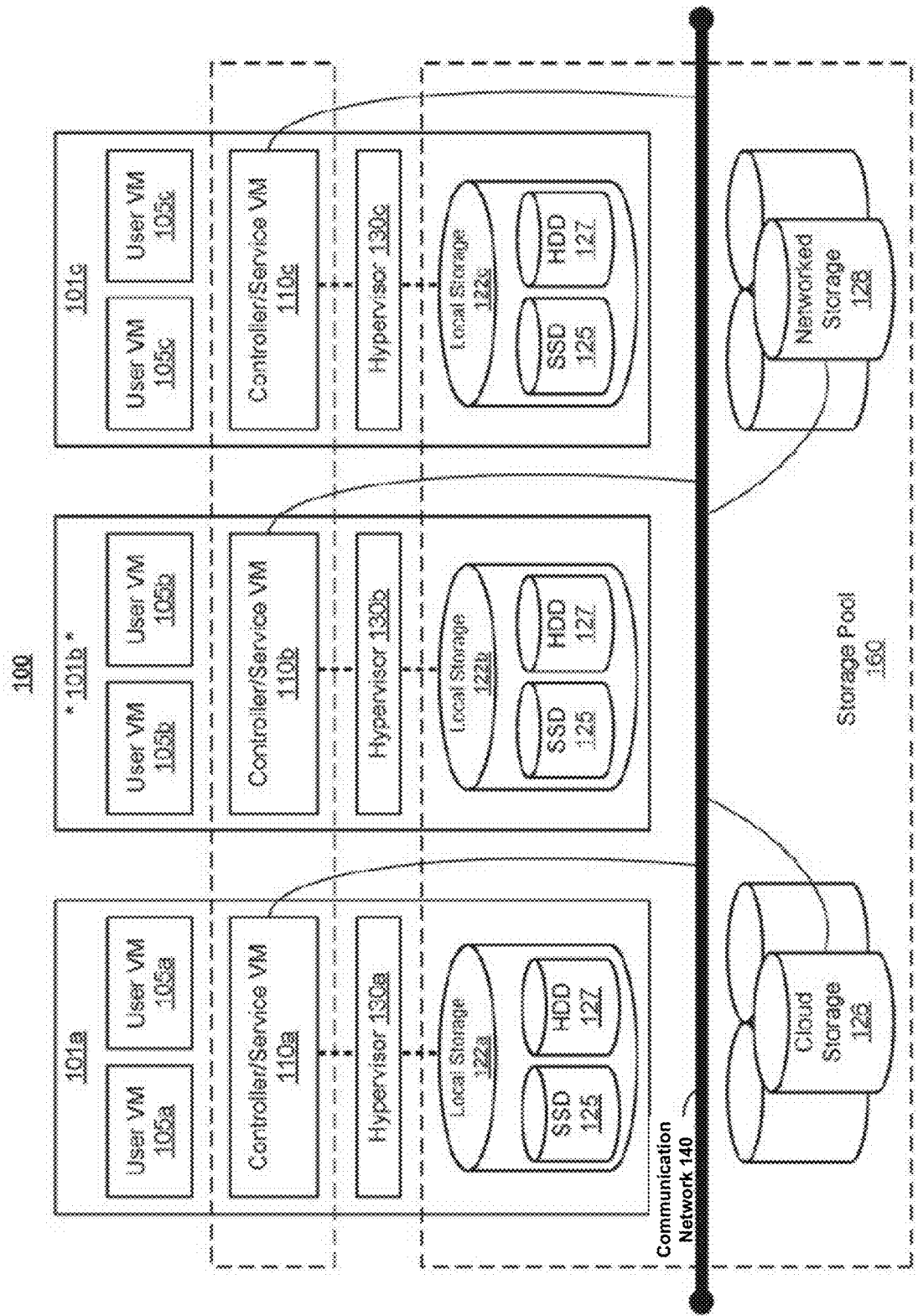
FIG. 1A is a block diagram illustrating a clustered virtualization environment according to an illustrative implementation.

Virtual machines allow multiple independent instances to coexist simultaneously on the same physical server. This allows vastly increased utilization of the physical server's resources, requiring fewer physical systems at a data center to operate the same number of business workloads, resulting in lower system maintenance costs, less power consumption and reduced cooling demands for the enterprise. Despite the scaling advantages of virtual machines, businesses with multiple locations or many employees, may need to build more than one data center in order to provide sufficient computing resources/services to all employees of the business. Moreover, unexpected demands for computing resources by the employees, such as during the holidays, may overburden the business's computing network requiring the business to contract with third-party cloud providers to lease their data centers during these peak times. However, the cloud providers tend to build their data centers far apart from one another and at locations that are undisclosed to the business leasing the data center, which presents numerous technical problems for a system administrator who builds the business's network. For example, employees who send network request to the data center cluster to request computing resources/services may be randomly connected to a data center that is distant to the employee's location. As such, the employee may experience significant latency issues in receiving their data or viewing applications running in a virtual machine.

Accordingly, the present disclosure is directed to systems and methods for automatically discovering the geographic locations of the customer-owned data centers and the cloud provider-owned data centers of a data center cluster and displaying their locations on one or more maps. A system administrator informed of the location for each data center may create efficient networking rules that redirect an employee's networking request for computing resources/services of a data center cluster to only local data centers; thereby, dramatically reducing network latency and network congestion.

Furthermore, a data center cluster with many data centers makes it difficult for the system administrator to monitor the status of the virtual machines executing at each data center For example, a system administrator must connect and disconnect to each data center one at a time to query the virtual machine status for that data centers. This prevents the system administrator from viewing the activity of all virtual machines in real-time, and having to send multiple connection and disconnection requests to the data center cluster.

Accordingly, the present disclosure also describes systems and methods for automatically discovering the status of the entities associated with data centers spanning across multiple geographic locations and causing display of the entity status in a single-view. Therefore, the system administrator may only need to send one request to simultaneously access the real-time status for all virtual machines, which alleviates network bottlenecks and network congestion.

In general, the system and method discussed herein allows a system administrator of a cluster of data centers (referred to herein as a data center cluster) to send a request for geolocation data from a user device to an infrastructure management server, which automatically determines and delivers the precise (or approximate) geographic location of each data center created by the cloud provider (and in some implementations, each data center created by the customer) contained within the data center cluster. That is, the infrastructure management server identifies each customer-owned data center of the data center cluster, establishes a connection with one or more host machines of each of the customer-owned data centers, sends instructions to the connected, customer-owned host machines causing them to (a) measure the round-trip time for a message that they send/receive from a single host machine residing at the cloud provider-owned data center, and (b) send the measured round-trip time(s) to the infrastructure management server. The infrastructure management server calculates the geolocation for the cloud provider-owned data center based on the round-trip time and generates display data that, when delivered to the user device, instructs (and causes) the user device to assemble/render the requested geolocation data on one or more geographic maps showing the geolocation of each data center in the data center cluster. In some implementations, the infrastructure management server may also identify and discover the status of each virtual machine executing (or previously executed) on the host machines of data centers spanning across multiple geographic locations. The infrastructure management server may then include the status data in the generation of the display data to instruct (and cause) the user device to assemble/render the multi-regional status data into a single-view.

Virtualization Technology and Environment

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Furthermore, there are now products that can aggregate multiple physical machines, running virtualization environments to not only utilize the processing power of the physical devices to aggregate the storage of the individual physical devices to create a logical storage pool wherein the data may be distributed across the physical devices but appears to the virtual machines to be part of the system that the virtual machine is hosted on. Such systems operate under the covers by using metadata, which may be distributed and replicated any number of times across the system, to locate the indicated data. These systems are commonly referred to as clustered systems, wherein the resources of the group are pooled to provide logically combined, but physically separate systems.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1A is a block diagram illustrating a clustered virtualization environment 100 according to an illustrative implementation. The architecture of FIG. 1A can be implemented for a distributed platform that contains multiple host machines 101 *a-c* (also collectively referred to herein as "host machines 101") that manage multiple tiers of storage. The multiple tiers of storage may include storage that is accessible through communication network 140, such as, by way of example and not limitation, cloud storage 126 (e.g., which may be accessible through the Internet), network-attached storage (NAS) 128 (e.g., which may be accessible through a LAN), or a storage area network (SAN). Unlike the prior art, the present embodiment also permits local storage 122*a-c* that is incorporated into or directly attached to the respective host machine 101 and/or appliance to be managed as part of storage pool 160. Examples of such local storage include Solid State Drives 125 (henceforth "SSDs"), Hard Disk Drives 127 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 160. Virtual disks (or "vDisks") may be structured from the physical storage devices in storage pool 160, as described in more detail below. As used herein, the term vDisk refers to the storage abstraction that is exposed by a Controller/Service VM (CVM) 110 to be used by a user VM 105. In particular embodiments, the vDisk may be exposed via iSCSI ("internet small computer system interface") or NFS ("network file system") and is mounted as a virtual disk on the user VM. In particular embodiments, vDisks may be organized into one or more volume groups (VGs).

Each host machine 101 may run virtualization software, such as VMWARE ESX(I), MICROSOFT HYPER-V, or REDHAT KVM. The virtualization software includes hypervisor 130*a-c* to create, manage, and destroy user VMs 105, as well as managing the interactions between the underlying hardware and user VMs 105. User VMs 105 may run one or more applications that may operate as "clients" with respect to other elements within virtualization environment 100. Though not depicted in FIG. 1A, a hypervisor may connect to communication network 140. In particular embodiments, a host machine 101 may be a physical hardware computing device; in particular embodiments, a host machine 101 may be a virtual machine.

CVMs 110*a-c* are used to manage storage and input/output ("I/O") activities according to particular embodiments. These special VMs act as the storage controller in the currently described architecture. Multiple such storage controllers may coordinate within a cluster to form a unified storage controller system. CVMs 110 may run as virtual machines on the various host machines 101, and work together to form a distributed system 110 that manages all the storage resources, including local storage 122, NAS 128, and cloud storage 126. The CVMs may connect to communication network 140 directly, or via a hypervisor. Since the CVMs run independent of hypervisors 130a-c, this means that the current approach can be used and implemented within any virtual machine architecture, since the CVMs of particular embodiments can be used in conjunction with any hypervisor from any virtualization vendor.

A host machine may be designated as a leader node within a cluster of host machines. For example, host machine 101b, as indicated by the asterisks, may be a leader node. A leader node may have a software component designated to perform operations of the leader. For example, CVM 110b on host machine 101b may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 110a-c exports one or more block devices or NFS server targets that appear as disks to user VMs 105a-c. These disks are virtual, since they are implemented by the software running inside CVMs 110a-c. Thus, to user VMs 105a-c, CVMs 110a-c appear to be exporting a clustered storage appliance that contains some disks. All user data (including the operating system) in the user VMs 105a-c and reside on these virtual disks.

Significant performance advantages can be gained by allowing the virtualization system to access and utilize local storage 122 as disclosed herein. This is because I/O performance is typically much faster when performing access to local storage 122 as compared to performing access to NAS 128 across a communication network 140. This faster performance for locally attached storage 122 can be increased even further by using certain types of optimized local storage devices, such as SSDs. Further details regarding methods and mechanisms for implementing the virtualization environment illustrated in FIG. 1A are described in U.S. Pat. No. 8,601,473, which is hereby incorporated by reference in its entirety.

Figure 1B:
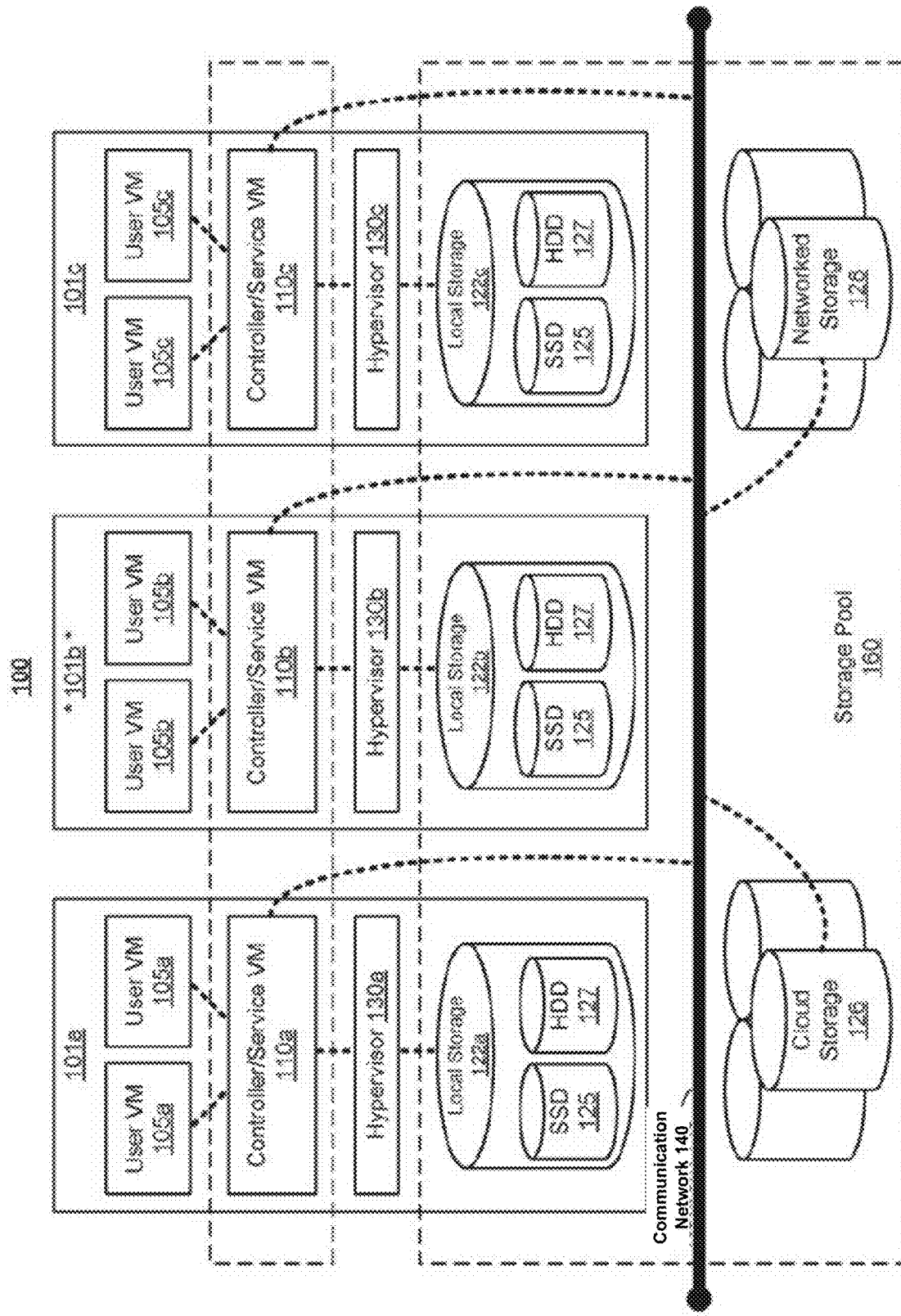
FIG. 1B is a block diagram illustrating the data flow within an example clustered virtualization environment according to an illustrative implementation.

FIG. 1B illustrates data flow within an example clustered virtualization environment 100 according to an illustrative implementation. As described above, one or more user VMs and a CVM may run on each host machine 101 along with a hypervisor. As a user VM performs I/O operations (e.g., a read operation or a write operation), the I/O commands of the user VM may be sent to the hypervisor that shares the same server as the user VM. For example, the hypervisor may present to the virtual machines an emulated storage controller, receive an I/O command and facilitate the performance of the I/O command (e.g., via interfacing with storage that is the object of the command, or passing the command to a service that will perform the I/O command). An emulated storage controller may facilitate I/O operations between a user VM and a vDisk. A vDisk may present to a user VM as one or more discrete storage drives, but each vDisk may correspond to any part of one or more drives within storage pool 160. Additionally or alternatively, CVM 110a-c may present an emulated storage controller either to the hypervisor or to user VMs to facilitate I/O operations.

CVM 110a-c may be connected to storage within storage pool 160. CVM 110a may have the ability to perform I/O operations using local storage 122a within the same host machine 101a, by connecting via communication network 140 to cloud storage 126 or NAS 128, or by connecting via communication network 140 to local storage 122b-c within another host machine 101b-c (e.g., via connecting to another CVM 110b or 110c). In some implementations, any suitable computing device (e.g., infrastructure management server 260) may be used to implement a host machine 101.

Management System for Cloud Infrastructure and Virtual Environments

Figure 2:
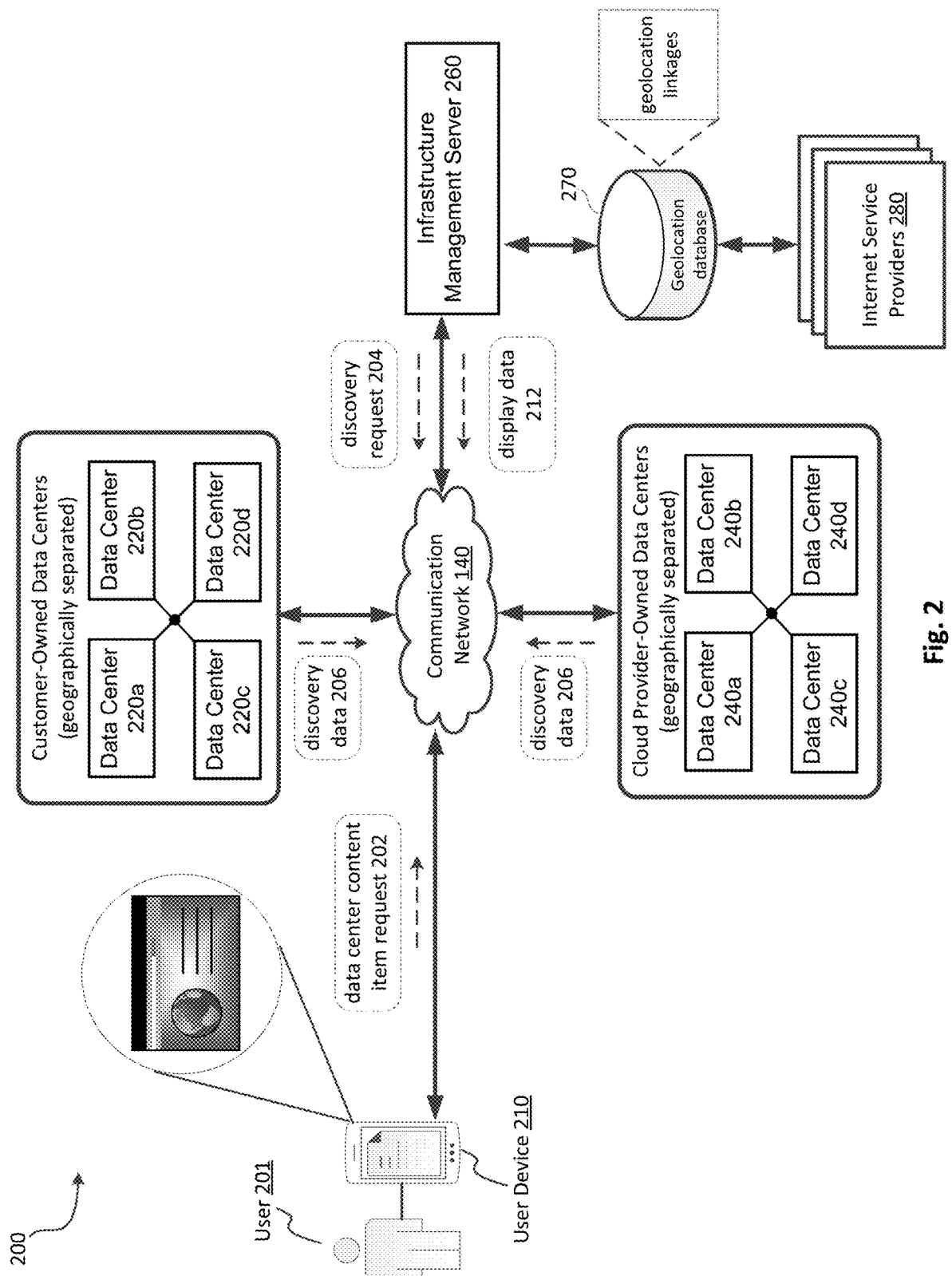
FIG. 2 is a block diagram depicting an example environment for automatically discovering the location of customer-owned data centers and cloud provider-owned data centers of a data center cluster and the status of their respective cloud entities, according to an illustrative implementation.

FIG. 2 is a block diagram depicting an example environment 200 for managing cloud infrastructure and virtual environments, according to an illustrative implementation. The environment 200 includes a user device 210 for a user 201 to send a request (e.g., data center content item request 202) to an infrastructure management server 260. The environment includes a cluster (referred to herein as a "data center cluster") of customer-owned data centers 220a-220d (also collectively referred to herein as "data centers 220") and cloud provider-owned data centers (also collectively referred to herein as "data centers 240") that may each be physically (e.g., geographically) or communicatively (e.g., firewalled) separated from one another. In some implementations, the cluster may include only customer-owned data centers or only cloud-provider-owned data centers. The environment includes an infrastructure management server 260 for automatically discovering the geographical locations of customer-owned (or customer-associated) and cloud provider-owned (or cloud provider-associated) data centers and the status of their executed virtual machines, and delivering display data (e.g., display data 212) to a user (e.g., user 201) of a computing device (e.g., user device 210). The user 201 may be an administrator of the data cluster who is responsible for the upkeep, configuration, and/or reliable operation of computer systems (e.g., host machines 101a-101c in FIG. 1) of one or more data centers of the data cluster. In some implementations, the user 201 may be associated (e.g., member, employee, independent contractor) with the customer-owned data centers, the cloud provider-owned data centers of the data center cluster, or both. In some implementations, the user 201 may be an individual or a business entity (e.g., a company, a corporation, a partnership, a Trust, an Association, or the like). The environment 200 includes a communication network 140 that connects user device 210 to one or more customer-owned and/or cloud provider-owned data centers and one or more infrastructure management servers 260.

The environment 200 may include a customer (not shown), such as an individual or business entity, that owns data centers 220. The environment 200 may include a cloud provider (not shown), such as an individual or business entity, that owns datacenters 240 and provides an administrator (e.g., user 201) with the authority (e.g., via a lease, rental agreement, oral agreement) to manage, control, and use the resources of the datacenters 240.

The environment 200 includes a geolocation database 270 for storing geolocation linkages provided from one or more internet service providers 280. The geolocation linkages associates (e.g., maps or links) "identifiable information" (as discussed herein) of any computing device or entity (e.g., data centers 220, 240) in environment 200 with its geolocation data. For example, the geolocation database 270 may associate and store the device identifier of data center 220b with the geolocation of data center 220b as "ID25<=> San Diego, Calif.". As discussed herein, in some implementations, the environment 200 may include fewer, additional, and/or different components. For example, the environment may omit the geolocation database 270 and/or internet service providers 280.

A data center cluster is a collection of data centers (e.g., data centers 220, 240) interconnected by a common network connection (e.g., communication network 140). A data center is a collection of racks, and each rack is a collection of computing systems, such as a server (e.g., host machines 101*a-c* in FIG. 1B). A server may contain a predetermined number of virtual nodes that function as the data storage layer within each server. Each data center provides a user and/or customer of the data center with storage and/or virtual machine resources.

The environment 200 may include many thousands of user devices 210, customer-owned data centers 220, cloud provider-owned data centers 240, customers (not shown), cloud providers (not shown), and infrastructure management servers 260; each interconnected via communication network 140. Each data center 220, 240 may share some or all of its stored "identifiable information" (e.g., geolocation data, entity status data, device identifiers, session identifiers, and display data, etc.) with any other data center 220, 240. In some implementations, environment 200 may include sub-clusters of a data center (data centers 220 and/or data centers 240) where the data centers within a sub-cluster are interconnected to one another via communication network 140 but communicatively unavailable (e.g., disconnected, isolated, fire-walled) to data centers of another sub-cluster. As such, each data center within a sub-cluster may share some or all of its stored data with other data centers connected to that subset. Although shown outside of data centers 220 and data centers 240, infrastructure management server 260 may be housed within any one of data centers 220, data centers 240, a customer location (e.g., a headquarters, a remote/satellite office), and a cloud provider location. In some implementations, a cloud provider may own multiple infrastructure management servers 260 and scatter (e.g., geographically/physically separated) them throughout a particular geographic region, such as a town, a city, a state, and a country.

The user device 210 is an electronic device that is under control/management of a user (e.g., user 101) and is capable of sending/receiving requests (e.g., data center content item requests 202) and resources/data (e.g., user data, user device identifiers, session identifiers, display data, content items, and) over communication network 140. Example user device 210 include personal computers (e.g., desktop or laptop), mobile communication devices (e.g., smartphones or tablets), video game console, servers, and other devices that can send and receive data over communication network 140.

The user device 210 may execute, operate, or otherwise provide an application (e.g., application 370 in FIG. 3A), such as any type and/or form of an internet/web browser, a web-based client, client-server application, a thin-client computing client, a graphic user interface (GUI), an email reader/client, and a File Transfer Protocol (FTP) client, an HTTP client, an Oscar client, a Telnet client, a voice over internet protocol client (VoIP), an infrastructure/virtual environment monitoring tool, an ActiveX control or a Java applet, or any other type and/or form of executable instructions capable of executing on user device 210, to facilitate the sending and receiving (and processing) of data between user device 210 and infrastructure management servers 260, via communication network 140. The user device 210 renders the data within/via the software application or may include (or execute) other content rendering applications (e.g., .pdf viewer, .doc viewer, txt viewer, .xls viewer, .ppt viewer, HyperText Markup (HTML) viewer, .jpg/.bmp/.png viewer, video viewer, map viewer, etc.) to display the received data on a display screen. In some implementations, user device 210 may receive display output data from a server (e.g., infrastructure management server 260) executing any thin-client or remote-display protocol, such as the Independent Computing Architecture (ICA) protocol, the Remote Desktop Protocol (RDP) manufactured; the X11 protocol; the Virtual Network Computing (VNC) protocol, the SPICE protocol, the Net2Display protocol, the PC-over-IP protocol, the TCX protocol, the THINC protocol, the Virtual-D protocols, any thin-client or remote-display protocol manufactured by VMware, Inc. or Nutanix, Inc., or any other thin-client or remote-display protocol.

The user device 210 may be configured to send a connection request to infrastructure management server 260 to establish a communication channel between the user device 210 and the infrastructure management server 260. In some implementations, the infrastructure management server 260 establishes an encrypted/secure communication channel between the user device 210 and the infrastructure management server 260. The connection request may include any "identifiable information" for infrastructure management server 260 to authenticate and grant the requested connection. For example, user device 210 may send a username/password combination that is encoded in its connection request to infrastructure management server 260. The user device 210 may be configured to receive from infrastructure management server 260, via the authenticated and established connection, display data (e.g., display data 212) that includes the geolocation and entity status data (e.g., virtual machine status, virtual node status, etc.) associated with one or more data centers 220 and/or data centers 240. The user device 210 may display (e.g., assemble/render) the data on a display within in a window (e.g., browser window, application window) of a software application (e.g., application in FIG. 370) executing on user device 210.

The user device 210 connects to the computing systems (e.g., host machines 101) of data centers 220, 240 and the infrastructure management server 260 via communication network 140. The communication network 140 is any suitable Local Area Network (LAN) or Wide Area Network (WAN), or Internet through a variety of communication protocols, such as TCP/IP, IPX, SPX, NetBIOS, Ethernet, ARCNET, SONET, SDH, Fiber Distributed Data Interface (FDDI), RS232, cellular (e.g., Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS)), Bluetooth, Wi-Fi, any suitable wired network, combination thereof, and/or the like. The communication network 140 is structured to permit the exchange of data, values, instructions, messages, commands, and the like between the user device 210, the computing systems (e.g., host machines 101) of data centers 220, 240 and the infrastructure management server 260. Although not illustrated, in many implementations, communication network 140 may comprise one or more intermediary devices, including gateways, routers, firewalls, switches, network accelerators, Wi-Fi access points or hotspots, or other devices.

The user device 210 may be configured to send a request to infrastructure management server 260 requesting the delivery of the precise (or approximate) geographic location of one or more customer-owned data centers 220 and one or more cloud provider-owned data centers of a data center cluster. The request may be in the form of a data center content item request 202. The data center content item request 202 may include any information (referred herein as "identifiable information") that allows infrastructure management server 260 to identify/discover the one or more data centers—and their respective host machines 101—of the data center cluster. For example, the user device 210 may include the MAC address for each host machine 101 of data center 220a, data center 220b, and data center 220c in the data center content item request 202 that it sends to infrastructure management server 260. Identifiable information may include any type and form of identification, including without limitation, a name of a user 201 (e.g., a name of the system administrator of a data cluster), a customer name (e.g., Company 'A') and/or identifier, a cloud provider name (e.g., Company 'B') and/or identifier, a data center name and/or identifier, a data center cluster name and/or identifier, a data center sub-cluster name and/or identifier, a virtual machine name and/or identifier, a virtual node name and/or identifier, a process name and/or identifier, a rack name and/or identifier, a server name and/or identifier, a Media Access Control (MAC) address, a network address, an Internet Protocol (IP) address (e.g., in the IPv4 form, such as 210.43.92.4, or in the IPv6 form, such as "2001:0db8:85a3:0000:0000:8a2e:0370:7334"), a device identifier, a session identifier, any data or user data collected by a collection agent (e.g., collection agent 315 in FIG. 3), and any other information associated with one or more data center clusters, data center sub-clusters, data centers 220, data centers 240, users 201, user devices 210, and/or a host machines 101. In some implementations, the user device 210 may include the "identifiable information" in the data center content item request 202 in a delimited string list format (e.g., device ID-SanDiego, Calif.). Example delimiters include commas (,), semicolon (;), quotes (",'), braces ({ }), pipes (|), slashes (A), a space ( ) a hyphen (-), an underscore (_), a hash sign (#), a percentage sign (%), a linkage sign (<=>), any single character (a-z), or any alphanumeric character string (e.g., b8).

In some implementations, the user device 210 may be configured to send a request to infrastructure management server 260 requesting the delivery of the status (herein referred to as "entity status") of one or more entities (e.g., virtual machines, virtual entities, virtual nodes, virtual cluster, hypervisor, etc.) executing on one or more host machines 101 of the customer-owned data centers 220 and one or more host machines 101 of the cloud provider-owned data centers of a data center cluster. The request may be in the form of a data center content item request 202 and may include a description and/or an identifier of the requested entity status. Example entity status may include, e.g., name; version; identifier; description; network address (e.g., assigned IP address, subnet address); guest operating system properties; CPU name, identifier, and/or usage; memory name, identifier, and/or usage; disk I/O name, identifier, and/or usage (e.g., used, capacity); memory usage, network I/O interface (NIC) name, identifier, and/or usage; NIC flaps, NIC Link Down status, IPMI IP status, launch status (e.g., running/enabled, shutoff/disabled, suspended); number of entities (e.g., running/enabled, shutoff/disabled, suspended); Input/output operations per second (IOPS), I/O bandwidth, latency, data resiliency. The entity status may also provide the status and health of the physical hardware (e.g., any component of host machine 101) on which the entities execute.

In some implementations, the user device 210 may be configured to receive a delivery request from a computing device (e.g., infrastructure management server 260, a host machine 101 from data center 220, a host machine from data center 240, or another user device 210) to deliver its stored "identifiable information" to another computing device (e.g., infrastructure management server 260, a host machine 101, data center 220, data center 240, or another user device 210). For example, user device 210 may receive a request from infrastructure management server 260 to deliver identifiable information associated with data centers 220a and data centers 240 to infrastructure management server 260. In response to the delivery request from infrastructure management server 260, a collection agent (e.g., collection agent 315 in FIG. 3) on user device 210 searches all software applications (e.g., application 370) executing on user device 210 and searches all hardware components (e.g., devices connected to network interface 305, devices connected to input/output circuit 306, cache areas of processor 303, memory 304, and internal/external hard drive storage) housed within or under the control of user device 210 for all "identifiable information" associated with the entity (e.g., data centers 220a and data centers 240) identified in the delivery request. The user device 210 then sends the requested identifiable information to infrastructure management server 260. In some implementations, the user device 210 may be configured to establish a connection with one or more host machines 101 associated with each data center 220, 240 to retrieve identifiable information. In some implementations, the user device 210 may be unable (e.g., geolocation information is unavailable) to retrieve or discover geolocation information directly from any of the data centers 220, 240 in the data center cluster or from its communication with any of their respective host machines 101. In some implementations, a delivery request from one infrastructure management server 260 for identifiable information associated with the data centers of the data center cluster prompts the user device 210 to send the requested identifiable information to all infrastructure management servers 260 managed/controlled by the cloud provider (not shown).

In some implementations, the user device 210 ("requestee") may be configured to receive a delivery request from a computing device ("requestor") to deliver the "identifiable information" of the computing device ("requestor") to another computing device ("beneficiary"). The delivery request may include any "identifiable information" stored by the requestor computing device, requestee computing device, and beneficiary computing device. For example, user device 210 may receive a request from a host machine 101 of data center 220a to deliver the geolocation of host machine 101—included in the request—to infrastructure management server 260. In response, user device 210 sends the geolocation of host machine 101 to infrastructure management server 260, which infrastructure management server 260 may store in its local storage (e.g., discovery data database 350 in FIG. 3B). In some implementations, user device 210 includes the received "identifiable information" (e.g., geolocation of host machine 101) from the requestor computing device in the data center content item request 202 that user device 210 sends to infrastructure management server 260.

In some implementations, user device 210 compresses (e.g., .bz2, .F, .gz, .lz, .lzma, .lzo, .rz, .sfark, .sz, .xz, .z, .Z) all or any portion of the identifiable information prior to transmitting it to the requested destination (e.g., infrastructure management server 260). In some implementations, user device 210 packages all or any portion of the identifiable information into an archive file (e.g.,.7z, .apk, .b1, .ba, .cab, .cfs, .ear, .jar, .zip). In some implementations, user device 210 transmits all or any portion of the identifiable information to infrastructure management server 260 without the need to receive a request, such as upon establishing a connection with infrastructure management server 260. In some implementations, user device 210 periodically transmits all or any portion of the identifiable information to infrastructure management server 260, such as every minute, hourly, daily, weekly, monthly, or any other such time period.

FIG. 3A is a block diagram depicting example details of the user device 210 of the environment 200 in FIG. 2, according to an illustrative implementation. The user device 210 is shown to include various circuits and logic for implementing the activities described herein. More particularly, the user device 210 includes one or more of a processing circuit 302, a network interface 305, an input/output circuit 306, a device identification circuit 307 (shown in FIG. 3A as device ID circuit 307), session identification circuit 308 (shown in FIG. 3A as session ID circuit 308), and application 370. While various circuits, interfaces, and logic with particular functionality are shown, it should be understood that the user device 210 includes any number of circuits, interfaces, and logic for facilitating the functions described herein. For example, the activities of multiple circuits are combined as a single circuit and implemented on a same processing circuit (e.g., the processing circuit 302), as additional circuits with additional functionality are included.

The user device 210 also includes a bus (not shown), such as an address bus, a data bus, or other communication mechanism for communicating information, which interconnects subsystems and devices, such as processing circuit 302, network interface 305, input/output circuit 306, device identification circuit 307 (shown in FIG. 3A as device ID circuit 307), session identification circuit 308 (shown in FIG. 3A as session ID circuit 308), and application 370. As such, some or all of the circuits of user device 210 are coupled to network interface 305 for communicating with one or more of the infrastructure management servers 260, host machines 101 of data centers 220, host machines 101 of data centers 240, or other user devices 210.

The processing circuit 302 includes a processor 303 and memory 304. The processor 303 is implemented as a general-purpose processor, a microprocessor, an application-specific integrated circuit (ASIC), one or more field-programmable gate arrays (FPGA), a digital signal processor (DSP), a group of processing components that are distributed over various geographic locations or housed in a single location or device, or other suitable electronic processing components. In many implementations, processor 303 may be a multi-core processor or an array of processors. The memory 304 stores data and/or computer instructions/code for facilitating the various processes described herein. The memory may include tangible, non-volatile memory random-access memory (NVRAM), random access memory (RAM), read only memory (ROM), EEPROM, EPROM, Flash Memory, hard disk storage, a floppy disk, optical disk (e.g., compact disk-read only memory (CD-ROM), digital video disk (DVD)), a magnetic disk, a memory chip, or any other suitable memory from which processor 303 can read instructions. The memory 304 may include database components, object code components, script components, or any other type of information structure for supporting the various activities and information structures described herein. The memory 304 stores programming logic (e.g., instructions/code) that, when executed by the processor 303, controls the operations of the user device 210. The instructions may include code from any suitable computer programming language such as, but not limited to, C, C++, C#, Java, JavaScript, VBScript, Perl, HTML, XML, Python, TCL, Basic, AWK, and assembly.

The network interface 305 is configured for and structured to establish a communication session via the communication network 140 with the infrastructure management server 260. Accordingly, the network interface 305 is an interface such as, but not limited to, the network interface 345, as described herein.

The input/output circuit 306 is configured to receive user input from and provide information to the user 101. In this regard, the input/output circuit 306 is structured to exchange data, communications, instructions, etc. with an input/output component of the user device 210. Accordingly, input/output circuit 306 may be any electronic device that conveys data to a user 101 by generating sensory information (e.g., a visualization on a display, one or more sounds, tactile feedback, etc.) and/or converts received sensory information from a user 101 into electronic signals (e.g., a keyboard, a mouse, a pointing device, a touch screen display, a microphone, etc.). The one or more user interfaces may be internal to the housing of user device 210, such as a built-in display, touch screen, microphone, etc., or external to the housing of user device 210, such as a monitor connected to user device 210, a speaker connected to user device 210, etc., according to various implementations. In some implementations, the input/output circuit 306 includes communication circuitry for facilitating the exchange of data, values, messages, commands, instructions, and the like between the input/output device and the components of the user device 210. In some implementations, the input/output circuit 306 includes machine-readable media for facilitating the exchange of information between the input/output device 306 and the components of the user device 210. In still another implementation, the input/output circuit 306 includes any combination of hardware components (e.g., a touchscreen), communication circuitry, and machine-readable media.

The device identification circuit 307 is configured to generate and/or manage a device identifier associated with user device 210. A device identifier may include any type and form of identification, including without limitation a Media Access Control (MAC) address, text and/or numerical data string, a username, a cryptographic public key, cookies, device serial numbers, user profile data, network addresses, an Internet Protocol (IP) address, or any other such identifier that may be used to distinguish the user device 210 from other user devices 210. In some implementations, a device identifier may be associated with one or more other device identifiers (e.g., a device identifier 'A' for a mobile device that is associated with a device identifier 'B' for a home computer). In many implementations, to preserve privacy, the device identifier may be cryptographically generated (via any hash function algorithm including, e.g., HMAC, SHA-1, SHA-2, SHA-3, MD2, MD4, and MD5), encrypted (e.g., via triple Data Encryption Standard (DES), RSA, blowfish, two-fish, or the Advanced Encryption Standard (AES)), or otherwise obfuscated by any circuit (e.g., processing circuit 302, device identification circuit 307, etc.) of user device 210.

The session identification circuit 308 is configured to generate and/or manage a session identifier associated with communication sessions between user device 210 and any other node/entity (e.g., infrastructure management server 260, a host machine 101, and other user devices 210, etc.) on communication network 140. A session identifier may be similar to a device identifier, but generated more frequently, such as every minute, hourly, daily, upon launching/executing application 370, or any other such time period or triggering event. A session identifier may be generated by the session ID circuit 308 or received from any other node/entity (e.g., host machine 101 from data center 220a or host machine 101 from data center 240a) on communication network 140. A session identifier may be used in place of device identifiers to increase anonymity, or may be used in connection with device identifiers to distinguish interactions of one session from those of another session. In many implementations, to preserve privacy, the session identifier may be cryptographically generated (via any hash function algorithm including, e.g., HMAC, SHA-1, SHA-2, SHA-3, MD2, MD4, and MD5), encrypted (e.g., via triple Data Encryption Standard (DES), RSA, blowfish, two-fish, or the Advanced Encryption Standard (AES)), or otherwise obfuscated by any circuit (e.g., processing circuit 302, session identification circuit 308, etc.) of user device 210.

The application 370 is communicably coupled to the infrastructure management server via the communication network 140. The application 370 is structured to assemble/render display data 212 that is receives from infrastructure management server on a display screen of user device 210, or an external display screen under the control of user device 210, such to show the geolocation of each data center in the data center cluster on a geographic map. In other implementations, the geolocation data is displayed as a list of Global Positioning Satellite (GPS) coordinates and/or a list of streets, cities, states, and or countries.

The application 370 is a server-based application executable on the user device 210. In this regard, the user 201 has to first download the application(s) prior to usage. In another implementation, the application 370 is coded into the memory 304 of the user device 210. In still another implementation, the application 370 is a web-based interface application. In this configuration, the user 101 has to log onto or otherwise access the web-based interface before usage. In this regard, the application 370 is supported by a separate computing system comprising one or more servers, processors, network interface modules, etc. that transmit the application 370 for use to the user device 210. In certain implementations, one or more of the applications 370 include an Application Programming Interface (API) and/or a Software Development Kit (SDK) that facilitate integration of other applications. All such variations and combinations are intended to fall within the spirit and scope of the present disclosure.

The application 370 includes a collection agent 315. The collection agent 315 may include an application plug-in, application extension, subroutine, browser toolbar, daemon, or other executable logic for collecting data processed by application 370 and/or monitoring interactions of user 201 with input/output circuit 306. In other implementations, the collection agent 315 may be a separate application, service, daemon, routine, or other executable logic separate from 370 but configured for intercepting and/or collecting data processed by application 370, such as a screen scraper, packet interceptor, API hooking process, or other such application.

The collection agent 315 may be configured for intercepting or receiving data input (or commands to modify a software or hardware setting of a computing device) via input/output circuit 306, including mouse clicks, scroll wheel movements, gestures such as swipes, pinches, or touches, or any other such interactions; as well as data received and processed by application 370 including enabling, disabling, and/or modifying features of application 370 to alter the appearance (e.g., appearance of a map or listing of GPS coordinates) of the content displayed on a screen (not shown) of user device 210 or an external screen (not shown) controlled by user device 210.

In some implementations, collection agent 315 may be configured to read the register/memory settings indicating the current setting for any feature associated with any software application executing on processor 203 (e.g., an operating system, application 370, an email client application, or any content rendering/viewing application as described herein), any hardware component housed within user device 210 (e.g., a graphics controller, display screen, etc.), and any external hardware component managed/operated by user device 210 (e.g., external display screen/projector, webcam, speaker, etc.). For example, collection agent 315 may determine that user device 210 is a mobile device based on reading the screen size from a register/memory setting of the graphics controller of user device 210.

In some implementations, collection agent 315 may send a request to application 370 prompting the user 201 of user device 210 with a pop-up window requesting additional user information. The user 201 of user device 210 may respond by entering the requested information into the pop-up window, making it available to collection agent 315 when it searches and gathers the identifiable information stored on user device 210. For example, collection agent 315 may request the user 101 to enter, into the pop-up window, the device identifiers of each host machine 101 of data center 220a. The user device 210 provides the identifiable information and any other information that it gathers to the infrastructure management server 260 that requested the information In some implementations, collection agent 315 begins intercepting/gathering/receiving data input via input/output circuit 306 based on a triggering event, including, e.g., a power-up of user device 210, a launch of a software application (e.g., an operating system, application 370, an email client application, or any content rendering/viewing application as described herein) executing on a processor of user device 210, the receipt of display data (e.g., display data 212), receipt of a request to deliver identifiable information (e.g., a request to deliver the device identifier and geolocations for each host machine 101 of customer-owned data centers), a connection with infrastructure management server 260, or the like.

Any data received/intercepted/read/generated by collection agent 315 and any other "identifiable information" stored on user device 210 may be shared between any circuit of user device 210. In many implementations, to preserve privacy, the identifiable information may be cryptographically generated (via any hash function algorithm including, e.g., HMAC, SHA-1, SHA-2, SHA-3, MD2, MD4, and MD5), encrypted, or otherwise obfuscated by any circuit (e.g., processing circuit 302, collection agent 315, device identification circuit 307, session identification circuit 308, etc.) of user device 210. In some implementations, any circuit of user device 210 may insert, pre-pend, append, or encode the identifiable information to a data center content item request 202.

FIG. 3B is a block diagram depicting example details of the interface management server 260 of the environment 200 in FIG. 2, according to an illustrative implementation. In general, the infrastructure management server 260 is configured to receive from a computing device (e.g., user device 210) a request (e.g., a data center content item request 202) for geolocation data of one or more data centers of a data center cluster. In response, the infrastructure management server 260 determines and delivers data (e.g., display data 212) that includes the precise (or approximate) geographic location of each data center owned by the cloud provider contained within the data center cluster by identifying each customer-owned data center of the data center cluster, establishing a connection with one or more host machines of each of the customer-owned data centers, sending a instructions (e.g., discovery request 204) to the connected customer-owned host machines causing them to (a) measure the round-trip time for messages that they send to and receive from host machines residing at the cloud provider-owned data center, and (b) send the measured round-trip times to the infrastructure management server. The infrastructure management server then calculates the geolocation for the cloud provider-owned data centers based on the round-trip times and generates display data (e.g., display data 212) that, when delivered to the user device, instructs (and causes) the user device to assemble/render the requested geolocation data on one or more geographic maps showing the geolocation of each data center in the data center cluster. The infrastructure management server 260 may repeat this process to discover the geolocation for each host machine of a cloud provider-owned data center.

In some implementations, the infrastructure management server 260 may determine and deliver data (e.g., display data 212) that includes the geographic location of each data center owned by the customer by identifying each cloud provider-owned data center of the data center cluster, establishing a connection with one or more host machines of each of the cloud provider-owned data centers, sending instructions (e.g., discovery request 204) to the connected cloud provider-owned host machines causing them to (a) measure the round-trip time for a message that they send to and receive from host machines residing at the customer-owned data center, and (b) send the measured round-trip times to the infrastructure management server. The infrastructure management server then calculates the geolocation for the customer-owned data centers based on the round-trip time and generates display data (e.g., display data 212) that, when delivered to the user device, instructs (and causes) the user device to assemble/render the requested geolocation data on one or more geographic maps showing the geolocation of each data center in the data center cluster. The infrastructure management server 260 may repeat this process to discover the geolocation for each host machine of a customer-owned data center.

The infrastructure management server 260 may also receive a request (e.g., a data center content item request 202) to identify and discover the status of each virtual machine executing (or previously executed) on the host machines of data centers spanning across multiple geographic locations. The infrastructure management server 260 may then include the status data in the generation of display data (e.g., display data 212) to instruct (and cause) the user device to assemble/render the multi-regional status data into a single-view. In some implementations, the display data (e.g., display data 212) may instruct (and cause) the user device to assemble/render the multi-regional status data into multiple views. In some implementations, the infrastructure management server 260 may generate display data that includes geolocation data of the data centers and status data of the virtual machines executing on their respective host machines 101.

In greater detail, the interface management server 260 is shown to include various circuits and logic for implementing the activities described herein. More particularly, the interface management server 260 includes one or more processing circuits 342, a network interface 345, an input/output circuit 346, a device identification circuit 347 (shown in FIG. 3A as device ID circuit 347), session identification circuit 348 (shown in FIG. 3A as session ID circuit 348), a discovery data database 350, a display data database 352, a geolocation discovery circuit 362, an entity status discovery circuit 364, a display data generator circuit 366, and a display data delivery circuit 368. While various circuits, interfaces, and logic with particular functionality are shown, it should be understood that the infrastructure management server 260 includes any number of circuits, interfaces, and logic for facilitating the functions described herein. For example, the activities of multiple circuits are combined as a single circuit and implemented on a same processing circuit (e.g., the processing circuit 342), as additional circuits with additional functionality are included.

In some implementations, the interface management server 260 may be a gateway (herein referred to as an "API gateway") that acts as an Application Programming Interface (API) front-end, receives API requests, enforces throttling and security policies, passes requests to the back-end service and then passes the response back to the requester (e.g., user device 210). As such, the interface management server 260 may include one or more transformation engines (not shown) to orchestrate and modify the requests and responses on the fly. In some implementations, the interface management server 260 may provide functionality such as collecting analytics data and providing caching. The interface management server 260 may provide functionality to support authentication, authorization, security, audit, and regulatory compliance.

The infrastructure management server 260 also includes a bus (not shown), such as an address bus, a data bus, or other communication mechanism for communicating information, which interconnects subsystems and devices, such as processing circuit 342, network interface 345, input/output circuit 346, device identifier 347, session identifier 348, geolocation discovery circuit 362, entity status discovery circuit 364, display data generator 366, display data delivery circuit 368, discovery data database 350, and display data database 352. As such, some or all of the circuits of infrastructure management server 260 are coupled to network interface 345 for communicating with one or more of the user devices 210, host machines 101 of data centers 220, host machines 101 of data centers 240, or other infrastructure management server 260.

The processing circuit 302 includes a processor 343 and memory 344. The processor 343 is implemented as a general-purpose processor, a microprocessor, an application-specific integrated circuit (ASIC), one or more field-programmable gate arrays (FPGA), a digital signal processor (DSP), a group of processing components that are distributed over various geographic locations or housed in a single location or device, or other suitable electronic processing components. The memory 304 stores data and/or computer instructions/code for facilitating the various processes described herein. The memory may include tangible, non-volatile memory random-access memory (NVRAM), random access memory (RAM), read only memory (ROM), EEPROM, EPROM, Flash Memory, hard disk storage, a floppy disk, optical disk (e.g., compact disk-read only memory (CD-ROM), digital video disk (DVD)), a magnetic disk, a memory chip, or any other suitable memory from which processor 343 can read instructions. The memory 344 may include database components, object code components, script components, or any other type of information structure for supporting the various activities and information structures described herein. The memory 344 stores programming logic (e.g., instructions/code) that, when executed by the processor 343, controls the operations of the infrastructure management server 260. The instructions may include code from any suitable computer programming language such as, but not limited to, C, C++, C#, Java, JavaScript, VBScript, Perl, HTML, XML, Python, TCL, Basic, AWK, and assembly.

The network interface 345 is structured for sending and receiving data over the communication network 140 (e.g., to and from the user device 210). Accordingly, the network interface 345 includes any type or form of communication protocol that is supported by communication network 140, as described herein. In many implementations, infrastructure management server 260 may include a plurality of network interfaces 345 of different types, allowing for connections to a variety of networks, such as local area networks (LAN) or wide area networks (WAN) including the Internet, via different sub-networks.

The network interface 345 may establish a communication channel between the infrastructure management server 260 and any other computing device in response to authenticating a connection request from the computing device. In some implementations, the network interface 345 may establish an encrypted/secure communication channel between the infrastructure management server 260 and any other computing device. The connection request may include any "identifiable information" for network interface 345 (or any other component of infrastructure management server 260) to use when authenticating and denying/granting the requested connection. For example, the network interface 345 may receive a connection request from a user device 210 that includes a username/password combination that is encoded into the connection request. In some implementations, the network interface 248 establishes an encrypted/secure communication channel between network interface 345 and any other computing device by forming a gateway or tunneling protocol via a Secure Socket Layer (SSL) or Transport Layer Security (TLS), or any other gateway protocol.

The input/output circuit 346 is configured to receive input from a user and/or a remote user (e.g., user 201 via user device 210) of infrastructure management server 260, and provide input to that user. In this regard, the input/output circuit 346 is structured to exchange data, communications, instructions, etc. with an input/output component of the respective user device. Accordingly, input/output circuit 346 may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of a user device, such as a built-in display, touch screen, microphone, etc., or external to the housing of a user device, such as a monitor connected to a user device, a speaker connected to a user device, etc., according to various implementations. In some implementations, the input/output circuit 346 includes communication circuitry for facilitating the exchange of data, values, messages, commands, instructions, and the like between the input/output device and the components of a user device. In some implementations, the input/output circuit 346 includes machine-readable media for facilitating the exchange of information between the input/output device 346 and the components of a user device. In still another implementation, the input/output circuit 346 includes any combination of hardware components (e.g., a touchscreen), communication circuitry, and machine-readable media. In some implementations (referred to as headless servers), infrastructure management server 260 does not include an input/output circuit, but instead uses network interface 345 to communicate with user device 210 across communication network 120.

The device identification circuit 347 is configured to generate and/or manage a device identifier associated with infrastructure management server 260. A device identifier may include any type and form of identification, including without limitation a Media Access Control (MAC) address, text and/or numerical data string, a username, a cryptographic public key, cookies, device serial numbers, user profile data, network addresses, an Internet Protocol (IP) address, or any other such identifier that may be used to distinguish the infrastructure management server 260 from other infrastructure management servers 260. In some implementations, a device identifier may be associated with one or more other device identifiers (e.g., a device identifier 'A' for a first server that is associated with a device identifier 'B' for a second server). In many implementations, to preserve privacy, the device identifier may be cryptographically generated (via any hash function algorithm including, e.g., HMAC, SHA-1, SHA-2, SHA-3, MD2, MD4, and MD5), encrypted (e.g., via triple Data Encryption Standard (DES), RSA, blowfish, two-fish, or the Advanced Encryption Standard (AES)), or otherwise obfuscated by any circuit (e.g., processing circuit 343, device identification circuit 347, etc.) of infrastructure management server 260.

The session identification circuit 308 is configured to generate and/or manage a session identifier associated with communication sessions between infrastructure management server 260 and any other node/entity (e.g., user device 210, a host machine 101, and other infrastructure management servers 260, etc.) on communication network 140. A session identifier may be similar to a device identifier, but generated more frequently, such as every minute, hourly, daily, or any other such time period. In some implementations, session identification circuit 348 may generate a session identifier each time a connection is established with a computing device (e.g., user device 210, a host machine 101, etc.) A session identifier may be generated by the session ID circuit 348 or received from any other node/entity (e.g., host machine 101 from data center 220a or host machine 101 from data center 240a) on communication network 140. A session identifier may be used in place of device identifiers to increase anonymity, or may be used in connection with device identifiers to distinguish interactions of one session from those of another session. In many implementations, to preserve privacy, the session identifier may be cryptographically generated (via any hash function algorithm including, e.g., Hash-Based Message Authentication Code (HMAC), Secure-Hash Algorithm 1 (SHA-1), SHA-2, SHA-3, Message-Digest Algorithm 2 (MD2), MD4, and MD5), encrypted (e.g., via triple Data Encryption Standard (DES), Rivest-Shamir-Adleman (RSA), blowfish, twofish, or the Advanced Encryption Standard (AES)), or otherwise obfuscated by any circuit (e.g., processing circuit 343, session identification circuit 348, etc.) of infrastructure management server 260.

The environment 200 includes a geolocation database 270 for storing geolocation linkages provided from one or more internet service providers 280. The geolocation linkages associates (e.g., maps or links) "identifiable information" (as discussed herein) of any computing device or entity (e.g., data centers 220, 240) in environment 200 with its geolocation data.

The discovery data database 350 is configured to store discovery data (e.g., discovery data 206) provided from host machines 101 of data centers 220, 240. The display data database 352 is configured to store display data (e.g., display data 212) provided from infrastructure management server 260. In some implementations discovery data database 350 and display data database 352 may be combined into a single database to store discovery data 206 and display data 212.

The geolocation discovery circuit 362 is configured to receive a request (e.g., data center content item request 202) for geolocation data of one or more data centers 220, 240 of a data center cluster. In response, the geolocation discovery circuit 362 identifies the one or more host machines 101 of the customer-owned data centers 220 and/or the cloud provider-owned data centers 240 that are contained within the data center cluster. In some implementations, the geolocation discovery circuit 362 identifies the one or more host machines 101 of the customer-owned data centers 220 and/or the cloud provider-owned data center 240 based directly on information (e.g., device identifier, network address, etc.) contained within the data center content item request 202. For example, a data center cluster named "Company Cluster" may include three customer-owned data centers: a data center 220a located in San Diego, Calif. that includes a first host machine 101a having an IP address of "192.168.56.11" and a second host machine 101a having an IP address of "192.168.56.12"; a data center 220b located in New York, N.Y. that includes a first host machine 101b having an IP address of "192.168.20.21" and a second host machine 101b having an IP address of "192.168.20.22"; and a data center 220c located in Dallas, Tex. that includes a first host machine 101c having an IP address of "192.168.76.31" and a second host machine 101c having an IP address of "192.168.76.32". The data center content item request 202 may include the IP addresses of each host machine 101. The geolocation discovery circuit 362 identifies the first and second host machines 101b of data center 220b, and the first and second host machines 101c of data center 220c by extracting the IP address for each host machine 101 from the request. The geolocation discovery circuit 362 may extract each IP address by parsing the data center content item request 202 based on a string delimiter, such as any delimiter described herein.

In some implementations, the geolocation discovery circuit 362 identifies the one or more host machines 101 of the customer-owned data centers 220 and/or the cloud provider-owned data centers 240 based partially on information (e.g., device identifier, network address, etc.) contained within the data center content item request 202. For example, the data center content item request 202 may include the data center cluster name of "Company Cluster". The geolocation discovery circuit 362 extracts the data center cluster name from the request and retrieves a list of data center clusters from a database, where each data center cluster includes a plurality of host machines that are associated with a customer and a plurality of host machines associated with a cloud provider. The geolocation discovery circuit 362 compares the data center cluster name that was extracted from the request to the contents in the list to determine if there exists a match (e.g., via a string comparison and/or regular expression). If a match is found, then the geolocation discovery circuit 362 extracts from the list, a network identifier associated with a host machine of a data center of the data center cluster. In some implementations, the geolocation discovery circuit 362 extracts a network identifier associated with a customer-owned data center if the data center content item request 202 indicates that a user 201 of a user device 210 requests to discover the location of a cloud provider-owned data center. In some implementations, the geolocation discovery circuit 362 extracts a network identifier associated with a cloud provider-owned data center if the data center content item request 202 indicates that a user 201 of a user device 210 requests to discover the location of a customer-owned data center. In some implementations, the geolocation discovery circuit 362 extracts the network address (e.g., 192.168.56.11, 192.168.56.12, 192.168.20.21, 192.168.20.22, 192.168.76.31, and 192.168.76.32) for each host machine (customer-owned and/or cloud provider-owned) corresponding to a matching data center cluster name, which provides the geolocation discovery circuit 362 with the capability to send a "fan-out" request (as described herein) to each host machine of a data center. The customer (not shown in FIG. 2) and/or the cloud provider (not shown in FIG. 2) may provide the list of data center clusters to the database at any time, e.g., when the customer and/or provider establishes/forms the data center cluster, adds host machines 101, and/or removes host-machines 101.

The geolocation discovery circuit 362 is configured to generate and send a discovery request (e.g., discovery request 204) to the identified host machine 101 of the customer-owned data center 220 or the cloud provider-owned data center 240. In some implementations, the geolocation discovery circuit 362 is configured in a "fan-out" mode, such that it generates and sends a discovery request 204 to a plurality of host machines 101 of the one or more customer-owned data centers 220 and/or the cloud provider-owned data centers 240. The discovery request causes the receiving host machine to perform a series of operations. For example, upon receipt of the discovery request, the receiving host machine 101 of a data center identifies another host machine 101 of another data center. In some implementations, the receiving host machine 101 identifies another host machine 101 of a customer-owned data center if the receiving host machine 101 is associated with a cloud provider-owned data center. In some implementations, the receiving host machine 101 identifies another host machine 101 of a cloud provider-owned data center if the receiving host machine 101 is associated with a customer-owned data center. The receiving host machine 101 generates a networking message (also referred to herein as a "routing message") to send to, and receive back from, the identified host machine 101 of another data center. The receiving host machine 101 measures the round trip time of the networking message as it routes between the receiving host machine 101 and the identified host machine 101. The receiving host machine 101 then generates discovery data based on the round-trip time and sends the discovery data to the infrastructure management server 260. In some implementations, the receiving host machine 101 sends networking messages to one or more host machines 101 in the data center, measures the round-trip time for each of the networking messages, and generates discovery data 206 based on some or all of the round-trip times of the one or more host machines 101.

The entity status discovery circuit 364 is configured to receive a request (e.g., data center content item request 202) for property and/or status information of one or more entities (e.g., virtual machines, etc.) executing on host machines 101 of one or more data centers of a data center cluster. In some implementations, the request may be for entities executing on host machines 101 of customer-owned data centers only. In some implementations, the request may be for entities executing on host machines 101 of cloud provider-owned data centers only. In response to the request, the entity discovery circuit 364 identifies the one or more host machines 101 of the customer-owned data centers 220 and/or the cloud provider-owned data centers 240 that are contained within the data center cluster. In some implementations, the entity discovery circuit 364 identifies the one or more host machines 101 of the customer-owned data centers 220 and/or the cloud provider-owned data center 240 based directly on information (e.g., device identifier, network address, etc.) contained within the data center content item request 202. For example, the entity status discovery circuit 364 may extract each IP address from the data center content item request 202 by parsing the data center content item request 202 based on a string delimiter, such as any delimiter described herein.

In some implementations, the entity status discovery circuit 364 identifies the one or more host machines 101 of the customer-owned data centers 220 and/or the cloud provider-owned data centers 240 based partially on information (e.g., device identifier, network address, etc.) contained within the data center content item request 202. For example, the entity status discovery circuit 364 may retrieve a list of data center clusters having available host machines 101. The list may be retrieved from a database, another host machine 101, or another infrastructure management server 260. The entity status discovery circuit 364 may issue a fan-out request to each host machine 101 of each available data center 220, 240 requesting each host machine to send their list (herein referred to as "VM list") of executing virtual machines. Each VM list includes each virtual machine's property information, identifier information, and/or entity status information. In some implementations, the entity status discovery circuit 364 may merge each VM list into a combined VM list. In some implementations, the host machines 101 and/or data centers 220, 240 that may be down/disconnected are ignored in the combined VM list so the combined view on a display screen (e.g., browser 400b in FIG. 4B) can continue to show users the views of available host machines 101 and/or data centers 220, 240. In some implementations, the VM list is extended to include availability zone (e.g., data center 220, 240) information from which the virtual machine was obtained as part of the merging/combining process.

The entity discovery circuit 364 is configured to generate and send a discovery request (e.g., discovery request 204) to the identified host machine 101 of the customer-owned data center 220 or the cloud provider-owned data center 240 to request entity status information. In some implementations, the entity discovery circuit 364 is configured in a "fan-out" mode, such that it generates and sends a discovery request 204 to a plurality of host machines 101 of the one or more customer-owned data centers 220 and/or the cloud provider-owned data centers 240. The discovery request causes the receiving host machines 101 to retrieve the status and/or property information associated with each virtual machine executing on the host machine 101 and deliver the retrieved information back to the entity discovery circuit 364.

The infrastructure management server 260 (via the network interface 345) is configured to send a connection request to each host machine 101 of a data center to establish an encrypted/secure communication channel between the host machine 101 and the infrastructure management server 260. The infrastructure management sever 260 connects to each host machine 101 based on the IP address the infrastructure management server 260 previously identified. In some implementations, the connection request from the infrastructure management server 260 may include any "identifiable information" (e.g., user name, password, cloud provider name) permitting the host machine 101 to authenticate and grant the requested connection. In some implementations, the infrastructure management server 260 may encrypt and secure the communication channel. In some implementations, the host machine 101 may encrypt and secure the communication channel. In some implementations, the infrastructure management sever 260 may connect and maintain connections with multiple host machines 101 within a single data center 220, 240 or across multiple data centers 220, 240. Accordingly, the infrastructure management sever 260 may send and receive information (e.g., entity status data/information) from each connected host machine 101 in real-time.

The display data generator circuit 366 is configured to generate display data (e.g., display data 212) that may instruct (and cause) a computing device (e.g., user device 210) to assemble/render a content item (e.g., geolocation data, entity status data) in a particular format/view on a display screen. For example, the display data 212 may instruct a computing device to display geographic and/or entity status data in any presentation view, e.g., on a map (e.g., geographic/physical, heat, statistical, topographical), in a list, in tabular format (e.g., rows and columns), on a graph (e.g., scatter, line, frequency polygon, pie chart, a bar graph, pictographs, organizational, cosmographs, histogram, flow-chart, 2-dimensional, 3-dimensional), and/or the like.

The display data generator circuit 366 generates the display data 212 based on the discovery data 206 (e.g., geolocation data, entity status data, round-trip time data of one or more routing messages, etc.) received from one or more host machines 101 of one or more data centers 220, 240. In some implementations, the display data generator circuit 366 generates the display data 212 based on the discovery data 206 associated with a single host machine 101 of a single customer-owned data center 220 or a single cloud provider-owned data center 240. In some implementations, the display data generator circuit 366 generates the display data 212 based on the discovery data 206 associated with a plurality of host machines 101 of a single customer-owned data center 220 or a single cloud provider-owned data center 240, but not both.

The display data generator circuit 366 inserts executable code into the display data 212 causing a computing device (e.g., user device 210) receiving the display data 212 to assemble/render a content item (e.g., geolocation data, entity status data) in a particular format/view on a display screen, as indicated by the display data 212. In some implementations, display data generator circuit 366 generates the display data 212 as an HTML file. In some implementations, display data generator circuit 366 generates the display data 212 as executable code (e.g., Java applet, JavaScript, VBScript) that one or more processors of a computing device (e.g., infrastructure management server 260, host machine 101, user device 210) may execute. In some implementations, display data generator circuit 366 may generate scripts (or dynamic links to scripts) to include/insert into the display data 212. The display data 212 and/or the scripts may instruct user device 210 to display a content item (e.g., the geolocation data, entity status data) in the "look and feel" represented by a viewing preference provided by the user 201 of user device 210. In some implementations, user device 210 may include the user's 101 viewing preference in the data center content item request 202 that it sends to infrastructure management server 260.

The display data delivery circuit 368 is configured to receive display data 212 from display data generator circuit 366 and deliver the display data 212 to user device 210. In some implementations, the display data delivery circuit 368 may receive a list containing pointers (or links) to multiple sets of display data 212 stored on a remote storage. As such, the display data delivery circuit 368 fetches each set of display data 212 as indicated by the links and delivers the fetched display data 212 to the user device 210 in a sequence of multiple transmissions bursts (e.g., each link equal one transmission burst). In some implementations, the display data delivery circuit 368 combines each fetched display data 212 and delivers the combined display data 212 to user device 210 in a single transmission.

Figure 4A:
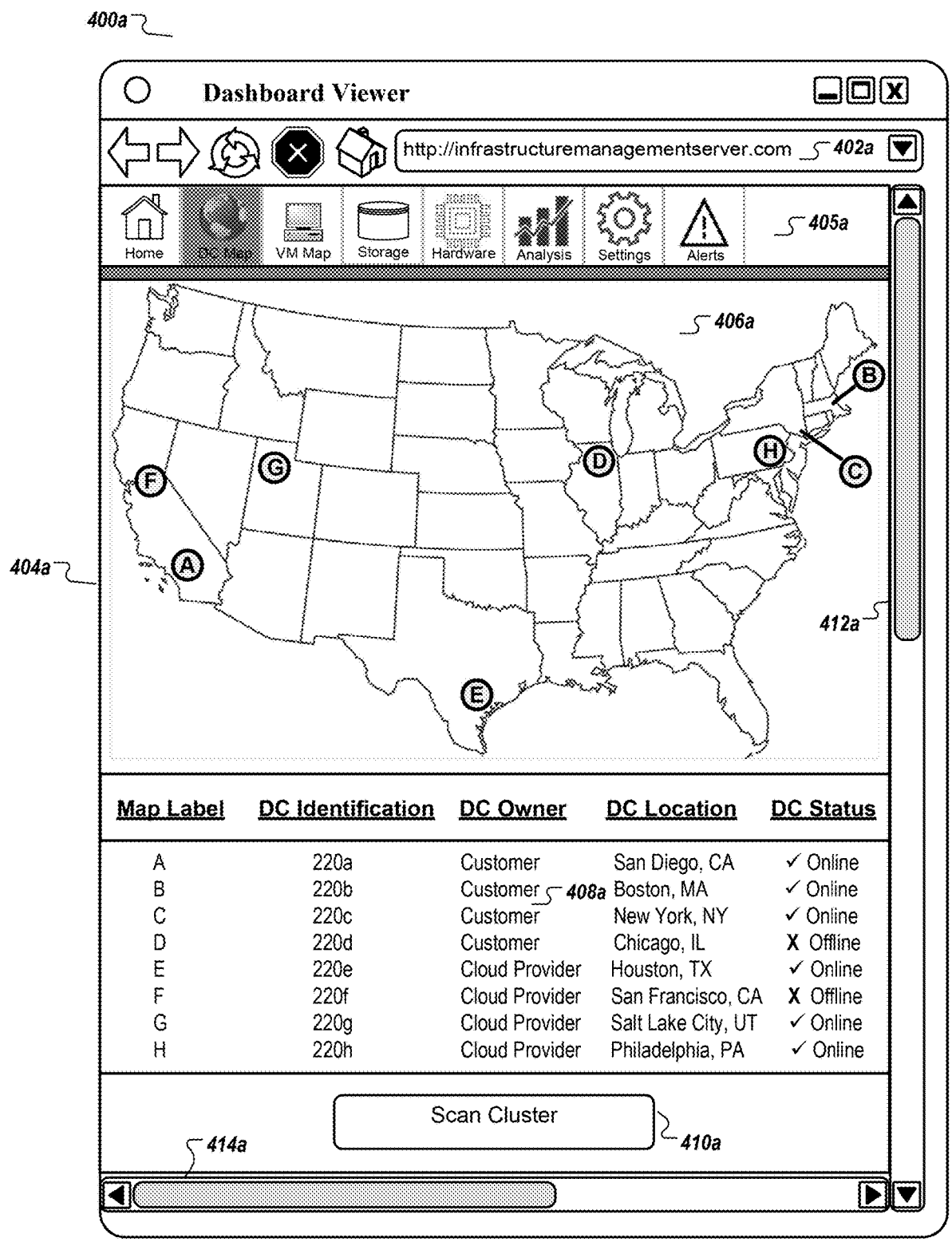
FIG. 4A is a diagram depicting an example browser for displaying discovery data associated with a data center cluster, according to an illustrative implementation.

FIG. 4A is a diagram depicting an example browser 400a for displaying discovery data associated with a data center cluster, according to an illustrative implementation. FIG. 4B is a diagram depicting an example browser 400b for displaying the geographic locations of customer-owned data centers and cloud provider-owned data centers of a data center cluster, according to an illustrative implementation. The browser 400a, 400b includes an input field 402a, 402b for a user 201 to type a uniform resource locator (URL) to establish a connection between user device 210 and an infrastructure management server 260. The browser 400a includes a browser window 404a for viewing a content item. The browser window 404a is divided into a map window 406a for viewing geolocation content on a graphical map and a listing window 408a for viewing content in a listing format. For example, the browser window 404a displays the geographical locations of customer-owned and cloud provider-owned data centers of a data center cluster on a map of the United States and the listing window 408a displays the same the geographical locations in a text-based list having rows and columns. The browser 400b includes a browser window 404b for viewing entity-status content in a listing format. For example, the browser window 404b displays the properties and running/offline status of each virtual machine executing on each host machine of the data centers of a data center cluster. The browser 400a, 400b includes a tab panel selector 405a, 405b for selecting a data viewing format. For example, the tab panel selector 405a in FIG. 4A is selected to display a data center map view (shown as 'DC Map'), while the tab panel selector 405b in FIG. 4B is selected to display a virtual machine map view (shown as 'VM Map'). The browser 400a, 400b includes a vertical scroll bar 412a, 412b allowing user 201 to vertically scroll the content item displayed in browser window 404a, 404b and a horizontal scroll bar 414a, 414b allowing user 201 to horizontally scroll the content item displayed in browser window 404a, 404b.

The browser 400a includes a button 410a to send a request (e.g., data center content item request 202) for geolocation data for each data center 220, 240 of a data center cluster and to populate the browser window 404a with the requested data. In some implementations, activating the button 410a sends a request for geolocation data for only the customer-owned data centers 220 and to populate the browser window 404a with the requested data. In some implementations, activating the button 410a sends a request for geolocation data of the cloud provider-owned data centers 240 only. In some implementations, activating the button 410a sends a request for geolocation data of the cloud provider-owned data centers 240 only. In some implementations, activating the button 410a sends a request for geolocation data to populate the browser window 404a in FIG. 4A and entity status data to populate the browser window 404b in FIG. 4B.

The browser 400b includes a button 410b to send a request (e.g., data center content item request 202) for entity status data for each data center 220, 240 of a data center cluster and to populate the browser window 404b with the requested data. In some implementations, activating the button 410b sends a request for entity status data for only customer-owned data centers 220 and to populate the browser window 404b with the requested data. In some implementations, activating the button 410b sends a request for geolocation data of the cloud provider-owned data centers 240 only. In some implementations, activating the button 410b sends a request for geolocation data of the cloud provider-owned data centers 240 only. In some implementations, activating the button 410b sends a request for geolocation data to populate the browser window 404a in FIG. 4A and entity status data to populate the browser window 404b in FIG. 4B.

The user 201 establishes a connection between user device 210 and an infrastructure management server 260 to request the delivery of a content item (e.g., geolocation data, entity status data, etc.) by entering "http://www.infrastructuremanagementserver.com" into input field 402a, 402b. Upon connection, the user device 210 (via browser 400a, 400b) sends a request to infrastructure management server 260 to generate and send display data 212 to browser 400a, 400b. The user device 210 (via browser 400a, 400b) receives the display data 212, causing the browser 400a, 400b to display the requested content item in the browser window 404a, 404b. The user 201 of user device 210 may activate the button 410a, 410b to send a new request (e.g., data center content item request 202) for the most-recent geolocation data and entity status data, which the browser 400a, 400b displays in its browser window 404a, 404b.

FIG. 5 is a flow diagram depicting a method for automatically discovering the geographic locations of customer-owned data centers and cloud provider-owned data centers of a data center cluster and the status of their respective entities, according to an illustrative implementation. Additional, fewer, or different operations may be performed in the method depending on the particular implementation. In some implementations, the some or all operations of method 500 may be performed by an infrastructure management system, such as infrastructure management system 260 in FIG. 2. In some implementations, some or all operations of method 500 may be performed by a user device, such as user device 210 in FIG. 2. Each operation may be re-ordered, added, removed, or repeated.

As shown, the method 500 begins with operation 502 where an infrastructure management server performs an operation receiving, from an application executing on a user device, a request for geolocation data of a first data center of a data center cluster. At operation 504, the infrastructure management server performs the operation of identifying a host machine of a second data center of the data center cluster based on the request. At operation 506, the infrastructure management server performs the operation of sending a discovery request to the host machine of the second data center. The discovery request causing operations comprising generating, by the host machine of the second data center, discovery data associated with a host machine of a first data center of the data center cluster. At operation 508, the infrastructure management server performs the operation of generating display data based on the discovery data. At operation 510, the infrastructure management server performs the operation of sending the display data to the user device, the display data causing the user device to display the geolocation data of the first data center in a window of the application. At operation 514, the infrastructure management server determines whether a user device sends an additional request for geolocation data. If yes, then infrastructure management server proceeds to operation 502 to repeat process 500 for the additional request. Otherwise, the infrastructure management server proceeds to operation 514 to perform the operation of disconnecting from the user device.

FIG. 6 is a flow diagram depicting a method for automatically discovering the status of the entities associated with data centers spanning across multiple geographic locations and causing display of the entity status in a single-view, according to an illustrative implementation. Additional, fewer, or different operations may be performed in the method depending on the particular implementation. In some implementations, the some or all operations of method 600 may be performed by an infrastructure management system, such as infrastructure management system 260 in FIG. 2. In some implementations, some or all operations of method 600 may be performed by a user device, such as user device 210 in FIG. 2. Each operation may be re-ordered, added, removed, or repeated.

As shown, the method 600 begins with operation 602 where an infrastructure management server performs an operation receiving, from an application executing on a user device, a request for entity data associated with one or more data centers of a data center cluster. At operation 604, the infrastructure management server performs the operation of identifying a host machine of a data center of the one or more data centers based on the request. At operation 606, the infrastructure management server performs the operation of sending a discovery request to the host machine of the data center. The discovery request causes operations comprising generating, by the host machine of the data center, entity data associated with the host machine of the data center and a second host machine of a second data center. At operation 608, the infrastructure management server performs the operation of generating display data based on the entity data. At operation 610, the infrastructure management server performs the operation of sending the display data to the user device, the display data causing the user device to display the entity data in a window of the application. At operation 612, the infrastructure management server determines whether a user device sends an additional request for entity data. If yes, then infrastructure management server proceeds to operation 602 to repeat process 600 for the additional request. Otherwise, the infrastructure management server proceeds to operation 614 to perform the operation of disconnecting from the user device.

This disclosure contemplates any suitable number of infrastructure management servers 260. This disclosure contemplates infrastructure management servers 260 taking any suitable physical form. As example and not by way of limitation, infrastructure management servers 260 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Where appropriate, infrastructure management servers 260 may include one or more computer systems 300; be unitary or distributed; span multiple locations; span multiple machines; span multiple data centers; or reside in a cloud, which may include one or more cloud components in one or more networks. Where appropriate, one or more infrastructure management servers 260 may perform without substantial spatial or temporal limitation one or more steps of one or more methods described or illustrated herein. As an example and not by way of limitation, one or more infrastructure management servers 260 may perform in real time or in batch mode one or more steps of one or more methods described or illustrated herein. One or more infrastructure management servers 260 may perform at different times or at different locations one or more steps of one or more methods described or illustrated herein, where appropriate.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the implementations might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example implementations described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

In particular embodiments, the bus (not shown) includes hardware, software, or both coupling components of infrastructure management server 260 to each other. As an example and not by way of limitation, the bus may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions may be made in the design, operating conditions and implementation of the implementations without departing from the scope of the present disclosure as expressed in the appended claims.

What is claimed is:

1. A computer-implemented method comprising:
    receiving, by an infrastructure management server and from an application executing on a user device, a request for geographic region data of a first data center of a data center cluster, wherein the first data center includes a first virtual machine and a first host machine;
    identifying, by the infrastructure management server, a second host machine of a second data center of the data center cluster based on the request;
    sending, by the infrastructure management server, a discovery request to the second host machine of the second data center to determine a geographic distance from the first data center to the second data center;
    generating, by the infrastructure management server, display data based on discovery data received in response to the discovery request;
    sending, by the infrastructure management server, the display data to the user device, the display data causes the user device to display geographic region data of the first data center and the second data center in a single-view of a window of the application; and
    establishing a networking rule to redirect a resource request from the second host machine to a local data center in the data center cluster that is geographically local to the geographic region of the second host machine.

2. The method of claim 1, wherein identifying the second host machine of the second data center of the data center cluster comprising:
    retrieving, by the infrastructure management server, a list of data center clusters from a database, each data center cluster having a plurality of host machines associated with a customer and a second plurality of host machines associated with a cloud provider; and
    comparing, by the infrastructure management server, the request for the geographic region data to the list of data center clusters to determine a match.

3. The method of claim 2, wherein identifying the second host machine of the second data center of the data center cluster further comprises:
    extracting, by the infrastructure management server in response to determining the match, a network identifier of the second host machine of the second data center; and
    establishing, by the infrastructure management server based on the network identifier, a communication channel between the infrastructure management server and the second host machine of the second data center.

4. The method of claim 1, wherein the discovery request causes operations comprising:
    identifying, by the second host machine of the second data center, the first host machine of the first data center.

5. The method of claim 1, wherein the discovery request causes operations comprising:
    measuring, by the second host machine of the second data center, a round-trip time of a message routing between the second host machine of the second data center and the first host machine of the first data center; and
    generating, by the second host machine of the second data center and based on the round-trip time of the message, the discovery data associated with the first host machine of the first data center of the data center cluster.

6. The method of claim 1, wherein identifying, by the infrastructure management server, the second host machine of the second data center comprising:
    extracting, by the infrastructure management server from the request for the geographic region data, a network address associated with the second host machine of the second data center; and
    sending, by the infrastructure management server based on the network address, the discovery request to the host machine of the second data center.

7. The method of claim 1, wherein the discovery request causes operations comprising:
    sending, by the second host machine of the second data center, a second discovery request to a third host machine of the second data center; wherein the second discovery request causes operations comprising generating, by the third host machine, second discovery data associated with the first host machine of the first data center.

8. The method of claim 7, further comprising:
    generating, by the infrastructure management server, the display data based on the discovery data and the second discovery data.

9. The method of claim 1, wherein the display data causes comprising:
    displaying, by the user device in a window of the application and on a geographical map, the geographic region data of the first data center and a geographic region of the second data center.

10. The method of claim 1, further comprising generating, by the second host machine of the second data center, the discovery data associated with the first host machine of the first data center of the data center cluster.

11. The method of claim 1, wherein the display data causes the user device to display the geographic region data of the first data center in a window of the application.

12. The method of claim 1, wherein the request for geographic region data of a first data center of a data center cluster is a request for geographic region data of both consumer-owned data centers and cloud-provider-owned data centers.

13. The method of claim 1, wherein discovery data associated with the first host machine of the first data center of the data center cluster includes discovery data to the second host machine of the second data center of the data center cluster.

14. The method of claim 1, further comprising generating, by the second host machine of the second data center, discovery data associated with the first host machine of a first data center of the data center cluster in response to the infrastructure management server sending a discovery request to the second host machine of the second data center.

15. The method of claim 1, wherein the geographic region data is state data.

16. An apparatus comprising a processor having programmed instructions to:
 receive, from an application executing on a user device, a request for geographic region data of a first data center of a data center cluster, wherein the first data center includes a first virtual machine and a first host machine;
 identify a second host machine of a second data center of the data center cluster based on the request;
 send a discovery request to the second host machine of the second data center to determine a geographic distance from the first data center to the second data center;
 generate display data based on discovery data received in response to the discovery request;
 send the display data to the user device, the display data causes the user device to display geographic region data of the first data center and the second data center in a single-view of a window of the application; and
 establish a networking rule to redirect a resource request from the second host machine to a local data center in the data center cluster that is geographically local to the geographic region of the second host machine.

17. The apparatus of claim 16, wherein the processor further has programmed instructions to:
 retrieve a list of data center clusters from a database, each data center cluster having a plurality of host machines associated with a customer and a second plurality of host machines associated with a cloud provider; and
 compare the request for the geographic region data to the list of data center clusters to determine a match.

18. The apparatus of claim 17, wherein the processor further has programmed instructions to:
 extract, in response to determining the match, a network identifier of the second host machine of the second data center; and
 establish, based on the network identifier, a communication channel between the apparatus and the second host machine of the second data center.

19. The apparatus of claim 16, wherein the discovery request causes the second host machine of the second data center to identify the first host machine of the first data center.

20. The apparatus of claim 16, wherein the discovery request causes the second host machine of the second data center to:
 measure a round-trip time of a message routing between the second host machine of the second data center and the second host machine of the first data center; and
 generate, based on the round-trip time of the message, discovery data associated with the second host machine of the first data center of the data center cluster.

21. The apparatus of claim 16, wherein the processor further has programmed instructions to:
 extract, from the request for the geographic region data, a network address associated with the second host machine of the second data center; and
 send, based on the network address, the discovery request to the second host machine of the second data center.

22. The apparatus of claim 16, wherein the discovery request causes the second host machine of the second data center to:
 send a second discovery request to a third host machine of the second data center; wherein the second discovery request causes generating, by the third host machine, second discovery data associated with the first host machine of the first data center.

23. The apparatus of claim 22, wherein the processor further has programmed instructions to:
 generate the display data based on the discovery data and the second discovery data.

24. The apparatus of claim 16, wherein the display data causes the user device to:
 display, in a window of the application and on a geographical map, the geographic region data of the first data center and a geographic region of the second data center.

25. The apparatus of claim 16, further comprising generating, by the second host machine of the second data center, the discovery data associated with the first host machine of the first data center of the data center cluster.

26. The apparatus of claim 16, wherein the display data causes the user device to display the geographic region data of the first data center in a window of the application.

27. A non-transitory computer readable storage medium to store a computer program configured to execute a method comprising:
 receiving, from a user device, a request for geographic region data of a first data center of a data center cluster, wherein the first data center includes a first virtual machine and a first host machine;
 identifying a second host machine of a second data center of the data center cluster based on the request;
 sending a discovery request to the second host machine of the second data center;
 generating display data based on discovery data received in response to the discovery request;
 sending the display data to the user device, the display data causes the user device to display geographic region data of the first data center and the second data center in a single-view of a window of the application; and
 establishing a networking rule to redirect a resource request from the second host machine to a local data center in the data center cluster that is local to the geographic region of the second host machine.

28. The non-transitory computer readable storage medium of claim 27, further comprising:
 retrieving a list of data center clusters from a database, each data center cluster having a plurality of host machines and a second plurality of host machines; and
 comparing a requested data center in the request for the geographic region data to the list of data center clusters to determine a match.

29. The non-transitory computer readable storage medium of claim 28, wherein identifying the second host machine of the second data center of the data center cluster comprising:
 extracting, in response to determining the match, a network identifier of the second host machine of the second data center; and
 establishing, based on the network identifier, a communication channel between the computer program and the second host machine of the second data center.

30. The non-transitory computer readable storage medium of claim 27, further comprising:
- measuring, by the first host machine, a round-trip time of a message routing between the first host machine of the second data center and the first host machine of the first data center; and
- generating, by the host machine and based on the round-trip time of the message, the discovery data associated with the first host machine of the first data center of the data center cluster.

31. The non-transitory computer readable storage medium of claim 27, further comprising:
- extracting, from the request for the geographic region data, a network address associated with the second host machine of the second data center; and
- sending, based on the network address, the discovery request to the second host machine of the second data center.

32. The non-transitory computer readable storage medium of claim 27, further comprising:
- generating the display data based on the discovery data and second discovery data.

33. The non-transitory computer readable storage medium of claim 27, further comprising:
- instructing the user device to display in a window of the application and on a geographical map, the geographic region data of the first data center and a geographic region of the second data center.

34. A non-transitory computer readable storage medium to store a computer program configured to execute a method comprising:
- receiving, from a user device, a request for geographic region data of a first data center and a second data center, wherein the first data center includes a first virtual machine and a first host machine;
- determining the geographic region data of the first data center and the second data center;
- generating display data based on the geographic region data;
- sending the display data to the user device, the display data causes the user device to display the geographic region data of the first data center and the second data center in a single-view of a window of the application; and
- redirecting a resource request from a first host machine of the first data center to a local data center based on geographic region data of the first data center and the second data center.

35. The non-transitory computer readable storage medium of claim 34, the method further comprising:
- identifying a third host machine of a third data center based on the request; and
- sending a discovery request to the third host machine of the third data center, wherein the discovery request causes the third host machine of the third data center to generate the geographic region data of the first data center and the second data center.

36. The non-transitory computer readable storage medium of claim 34, the method further comprising sending a discovery request to a third host machine of a third data center;
- measuring, by the third host machine of the third data center, a round-trip time, by the host machine of the third data center, for a message to each of a first host machine of the first data center and a second host machine of the second data center; and
- generating, by the third host machine of the third data center and based on the round-trip time, the geographic region data associated with the first data center and the second data center.

37. The non-transitory computer readable storage medium of claim 34, the method further comprising sending a first discovery request to a first host machine of a third data center and a second discovery request to a second host machine of the third data center,
- wherein the first discovery request and the second discovery request cause the first host machine and the second host machine of the third data center, respectively, to generate the geographic region data of the first data center and the second data center, respectively.

* * * * *